United States Patent
Dabush et al.

(10) Patent No.: US 12,287,911 B2
(45) Date of Patent: Apr. 29, 2025

(54) VIRTUAL REALITY DE-ESCALATION TOOL FOR DELIVERING ELECTRONIC IMPULSES TO TARGETS

(71) Applicant: V-Armed Inc., New York, NY (US)

(72) Inventors: Elad Dabush, Herzliya (IL); Rotem Shiffman, Brooklyn, NY (US)

(73) Assignee: V-Armed Inc., NY (US)

( * ) Notice: Subject to any disclaimer, the term of this patent is extended or adjusted under 35 U.S.C. 154(b) by 103 days.

(21) Appl. No.: 18/078,118

(22) Filed: Dec. 9, 2022

(65) Prior Publication Data

US 2023/0214007 A1 Jul. 6, 2023

Related U.S. Application Data

(60) Provisional application No. 63/294,864, filed on Dec. 30, 2021.

(51) Int. Cl.
*G06F 3/01* (2006.01)
*G02B 27/00* (2006.01)
*G02B 27/01* (2006.01)

(52) U.S. Cl.
CPC .......... *G06F 3/011* (2013.01); *G02B 27/0093* (2013.01); *G02B 27/017* (2013.01)

(58) Field of Classification Search
CPC .... G06F 3/011; G02B 27/017; G02B 27/0093
See application file for complete search history.

(56) References Cited

U.S. PATENT DOCUMENTS

| | | | | |
|---|---|---|---|---|
| 11,887,507 | B2 * | 1/2024 | Shiffman | G06F 3/0304 |
| 2011/0207089 | A1 * | 8/2011 | Lagettie | F41G 3/2611 |
| | | | | 434/22 |
| 2015/0260474 | A1 * | 9/2015 | Rublowsky | F41A 33/00 |
| | | | | 434/16 |
| 2017/0318027 | A1 * | 11/2017 | Rodniansky | H04L 63/1425 |
| 2017/0319956 | A1 * | 11/2017 | Vandonkelaar | A63F 13/5255 |
| 2020/0341542 | A1 * | 10/2020 | Kur | G06F 3/012 |

* cited by examiner

*Primary Examiner* — Kwang-Su Yang
(74) *Attorney, Agent, or Firm* — Gearhart Law, LLC

(57) ABSTRACT

A VR system is described. A simulation engine receives position data of an object during a scenario and transmits the position data to a modular symptoms generator. The modular symptoms generator queries a database to determine predefined position data for the object during the scenario and compares the captured position data with the predefined position data for the object during the scenario. If the position data for the object meets or exceeds the predefined position data, the modular symptoms generator executes a first modification on a portion of the scenario and if the position data for the object fails to meet or exceed the predefined position data, the modular symptoms generator executes a second modification on a portion of the scenario. The first modification results in a more favorable situation as compared to the situation resulting from the second modification.

19 Claims, 26 Drawing Sheets

VIRTUAL REALITY DE-ESCALATION TOOL FOR DELIVERING ELECTRONIC IMPULSES TO TARGETS

CLAIM OF PRIORITY

This application claims the priority from U.S. provisional application Ser. No. 63/294,864, filed Dec. 30, 2021 entitled VIRTUAL REALITY DE-ESCALATION TOOL FOR DELIVERING ELECTRONIC IMPULSES TO TARGETS, the entirety of which is hereby incorporated by reference as if fully set forth herein.

FIELD OF THE EMBODIMENTS

This invention relates to virtual reality ("VR") training systems. In particular, the present invention relates towards multi-participant and free-roaming VR training systems. Further, the present invention relates towards VR de-escalation tools for delivering electronic impulses to targets.

BACKGROUND OF THE EMBODIMENTS

VR is a technology for displaying a virtual environment or a scenario to a user, where the virtual environment appears to be a real or true environment. The virtual image or image signal is generated by a computer that allows a user to dissociate himself or herself from a physical environment and act as if in the VR environment. A VR may include audio and haptic components, in addition to a visual component.

To create a virtual world with virtual images, images and textures are traditionally programmed into graphics engines. Additionally, images may be created from digitized photos, video, or scanned images. These virtual images and their three-dimensional (3D) characterizations are stored in computer memory. These stored images are manipulated to produce a VR image signal that is presented for display to the user often as a result of a user input or under computer programmed control.

The visual component of a VR system may be displayed either on a computer screen or with a stereoscopic head-mounted display. Some conventional head-mounted displays simply project an image or symbology on a wearer's visor or reticle, where the projected image does not change based on the wearer's head position. Other head-mounted displays may incorporate a positioning system that tracks the user or wearer's head position and angle, so that the picture or symbology projected by the display is congruent with the outside world using see-through imagery.

Head-mounted displays may also be used with tracking sensors that allow changes of angle and orientation of the wearer to be recorded. When such data is available to the system providing the VR environment, it can be used to generate a display that corresponds to the user or wearer's angle-of-look at the particular time. This allows the wearer to "look around" a VR environment simply by moving the head without the need for a separate controller to change the angle of the imagery.

VR systems may be wired or wireless. Such wireless systems allow the user or participant to move freely about or freely roam within tracking limits of the system. Appropriately placed sensors or indicators allow the VR system to track movements and actions of the participant, allowing for natural interactions with content.

However, the scenarios generated by the VR systems are often static and cannot be easily manipulated by users. Such systems fail to provide client-facing authoring tools, allowing the user to replay the scenario (e.g., for training purposes) and modify aspects or parameters of the scenario. Additionally, such systems fail to provide client-facing authoring tools geared towards multi-participant and free-roaming VR.

Moreover, such systems fail to allow the user to experience what can happen as a result of a user action. For example, if the user in the VR scenario successfully unarms a gunman, the scenario ends. However, this is not the case in the real world, where the user will need to learn how to apprehend the gunman. Thus, what is needed is a VR training system that allows the user to transition from a first situation (e.g., an active shooter scenario) to a second situation (e.g., a triage scenario) of the simulation based on the actions of the user during the simulation.

Examples of related art are described below:

U.S. Pat. No. 10,885,709 B2 and CA 3,008,498 A1 relate to a VR software system that includes a VR headset with a display unit configured to display a three-dimensional VR environment. The VR headset includes a processor and a memory to display the three-dimensional VR environment on the display unit. The VR software system is useful for providing a simulation for completing a medical-mission to eliminate a virtual-representation of a medical condition associated with a user.

U.S. Published Patent Application No. 2020/0281657 A1 relates to systems and methods for VR training of medical events. In one aspect, a method for generating a VR medical training environment can include displaying a medical event through a VR headset; receiving, from a user of the VR headset, a set of verbal responses corresponding to the user reacting to the medical event; determining a timestamp for at least one verbal response received from the user; determining a medical event score for the user based on the set of verbal responses and the timestamp; and displaying a summary of the medical event score via the VR headset or a display screen.

U.S. Pat. No. 10,726,744 B2 relates to a medical/veterinary procedure simulation apparatus that includes a simulated mammalian body part. The simulated mammalian body part further includes one or more anatomical replications of mammalian tissue.

U.S. Pat. No. 10,672,288 B2 relates to a method and apparatus for an augmented reality simulator for professional and educational training. The simulator provides a training environment spanning one or more physical locations in which one or more virtual avatars representing purely virtual objects or persons or real physical objects or persons which are located at a different physical location are projected into the physical space. The avatars are interactive with other avatars and real objects or persons and update over time or in response to actions taken by other real or virtual elements, or based on predefined instructions. Sensors and devices are used to detect the locations of and actions taken by real persons or real objects and this sensed data is used to evolve the state of the simulation and avatars based on predefined instructions and programs and update the view of all participants.

WO 2020/091385 A1 relates to a VR device and method for medical training. To this end, provided are: a reference plane data generation step of generating phantom reference plane data on the basis of phantom markers formed on a phantom in real image data and generating medical appliance reference plane data on the basis of medical appliance markers formed on a medical appliance; a matching step of generating matching data by matching the phantom reference plane data and the medical appliance reference plane data to each other; a rendering step of generating and outputting phantom rendering data, which is 3D rendering data for the phantom, and medical appliance rendering data, which is 3D rendering data for the medical appliance, on the basis of the phantom reference plane data, the medical appliance reference plane data, and the matching data; and a medical appliance movement step of updating the medical appliance reference plane data according to the motion of the medical appliance and generating and outputting medical appliance rendering data in reference to the updated medical appliance reference plane data.

JP 2019/537459 A, WO 2018/083687 A1, and WO 2018/061014 A1 relate to systems and methods for simulating medical procedures in a VR operating room for a training a trainee. A medical procedure can be simulated and a trainee can manually manipulate a medical tool to perform the simulated medical procedure in VR on a VR avatar in the VR simulation.

U.S. Pat. No. 10,551,910 B2 relates to a VR system and a method to improve clinical outcomes. The VR system includes a virtual display device capable of providing VR images to a patient; one or more actuators capable of providing physical experience to the patient; and a controller. The controller is capable of: automatically selecting a treatment model based upon one or both of (a) a received identity of a medical treatment applied to the patient and (b) a received identity of a targeted disease of the patient; and coordinating the virtual display device and the one or more actuators to provide a synchronized immersive VR environment for the patient to experience based upon the treatment model.

U.S. Published Patent Application No. 2019/0206134 A1 relates to systems for rendering an immersive environment. The systems includes at least one electronic device configured to be coupled to a body part of a user. The at least one electronic device includes a sensor, an actuator, or both. The systems also include a processor capable of being communicatively coupled to the at least one electronic device and a rendering device capable of being communicatively coupled to the processor. The processor is configured to execute machine-executable instructions that, when executed by the processor, cause the processor to obtain data from or provide data to the at least one electronic device. The rendering device is configured to receive rendering information from the processor, and render the immersive environment based at least in part on the rendering information from the processor.

CN 106251752 A provides an augmented reality and VR combined medical training system. Three-dimensional images of operation appliances used by operation target objects and training personnel are acquired through a three-dimensional image acquisition module, operation motion of the training personnel is captured in real time through a motion capture module, correction information and guidance information are output through a central processor, an augmented reality or a VR model comprising the three-dimensional images acquired by the three-dimensional image acquisition module, the guidance information and the correction information is established, and the training personnel obtains the status of the operation target objects and the operation appliances used by the operation target objects, the guidance information and the correction information in real time through an augmented reality interaction module, such that medical training is enabled to be more realistic and vivid, the medical training period is shortened, and the medical training cost is decreased.

U.S. Pat. No. 5,759,044 A describes a system for generating and processing synthetic and absolute real-time remote environments for interaction with a user. Various modules track user data to accurately place the user in the generated and processed model. This system may be used in law enforcement applications (e.g., solving crimes by re-enactment of events, securing witnesses, and/or protecting their identities).

U.S. Published Patent Application No. 2006/0017654 A1 describes a VR interactivity system and method of operation. The system includes position indicators that indicate positions in a physical coordinate system, each being associated with one object of a plurality of objects located within the physical environment mapped by the physical coordinate system. The system also includes a position communication system that communicates the positions of the position indicators. The system further includes a VR user module associated with a user positioned within the physical environment. The VR user module determines a position of an object within the physical coordinate system as a function of the position signals. The user module determines a position of an associated object within the VR coordinate system and generates a VR image signal that includes the determined position of the associated object within the VR coordinate system. The user module also includes a VR user interface that displays a VR image to the user as a function of the VR image signal. This VR technology may be used in numerous fields, including: military training simulations and/or law enforcement training simulations.

EP 3,537,263 A3 describes a system and method for presenting an augmented reality view. The system may include a database for personalizing an augmented reality view of a physical environment using a location of a physical environment and/or a location of a user. The system may further include a hardware device in communication with the database. The hardware device may include a renderer configured to render the augmented reality view for display and a controller configured to determine a scope of the augmented reality view, authenticating the augmented reality view. The hardware device may further include a processor configured to receive the augmented reality view of the physical environment, and present, via a display, augmented reality content to the user while the user is present in the physical environment, based on the determined scope of the augmented reality view.

U.S. Pat. No. 10,441,868 B2 describes a VR system for providing law enforcement training to players.

CN 106710351 A describes a VR police service training device that includes head-wearing display equipment, tracing equipment, an operating handle, a communication module, and a mainframe. The head-wearing display equipment is used for providing a stereo image having a binocular parallax. The tracing equipment is used for tracing the body posture of a user. The operating handle is used for transmitting position and control signals to the mainframe. The communication module is used for communication between all equipment. The mainframe is used for receiving the position and control signals from the operating handle and generating the stereo image.

WO 2019/099912 A1 describes a system and method to render a three-dimensional (3D) virtual environment for military training use.

WO 2007/133209 A1 describes a method for using augmented reality (AR), in conjunction with a real or simulated thermal imager. Primary applications of this invention include training: emergency first responders, military personnel, and/or law enforcement personnel.

EP 1,960,063 A2 describes a system configured to simulate military training situations. The system includes an interface, an effector having at least one sensor, a platform, and control circuitry that includes a processor. The platform accommodates a user in a standing position and includes the effector attached thereto. The sensor measures at least one force applied by a lower body portion of a user to the effector, causing a measurable strain on the effector. An additional effector with at least one sensor and a game controller may further be attached to the platform. The sensor measures at least one force applied by an upper body portion of a user to the additional effector, causing a measurable strain on that effector. The processor receives and processes data corresponding to applied force information for transference to the host computer system to update a VR scenario.

U.S. Pat. No. 8,651,964 B2 describes a video control system that allows for a realistic experience in a video environment, in which movement of the video player is replicated and appreciated on a video screen. The user is completely untethered from the game computer and has complete 3-D freedom within a thirty foot radius of the game computer. This provides a realistic physical dimension to a video game system, which can be used for realistic military and law enforcement training or commercial game playing applications.

None of the art described above teaches the system or method described in this present invention.

SUMMARY OF THE EMBODIMENTS

The present invention and its embodiments relate to VR training systems. In particular, the present invention and its embodiments relate towards multi-participant and free-roaming VR training systems. Further, the present invention relates towards VR de-escalation tools for delivering electronic impulses to targets.

A first embodiment of the present invention describes a VR system. The VR system includes a physical environment defined at least partially by a physical coordinate system and comprising one or more physical objects. The VR system also includes one or more users located in the physical environment. Each of the one or more users are configured with wearable devices and a weapon. Further, each of the wearable devices and the weapon comprise a position indicator configured to detect position data in the physical environment. Examples of wearable devices include: a VR system head-mounted display, a backpack, at least one ankle strap, and/or at least one wrist strap, among others. Examples of the weapon include: a taser, a pepper spray canister, a gun, and/or a flashlight, among others.

Further, the VR system includes a computing device communicatively coupled to a server. The computing device includes a simulation engine that is configured to control a scenario for the VR system. The VR system also includes a modular symptoms generator configured to interact with the simulation engine and the server. The physical environment of the VR system includes one or more cameras configured to: monitor a portion of the physical environment, capture the position data of each position indicator within the portion of the physical environment, and transmit the position data of each position indicator within the portion of the physical environment to a network switch. The network switch transmits the position data of each position indicator within the portion of the physical environment to the first computing device.

A second embodiment of the present invention describes a method executed by a virtual reality system for providing a simulation scenario. The method includes numerous process steps, such as: receiving, by a simulation engine of a virtual reality system, position data of an object during a simulation scenario. The object includes a user, a wearable device, a weapon, or a physical object, among others. The wearable device includes a backpack, a head-mounted display, an ankle strap, or a wrist strap, among others. The physical object includes a flashlight, a doorway, a wall, a ceiling, a floor, a doorknob, a steering wheel, a step, a surface, a freely movable object, a desk, a table, or a door, among others. The weapon includes a taser, a pepper spray canister, or a gun, among others.

Further, the simulation includes: a video gaming simulation scenario, a situational awareness training simulation scenario, an entertainment simulation scenario, an active shooter simulation scenario, a military training simulation scenario, a traffic stop simulation scenario, a car crash simulation scenario, a lifesaving simulation scenario, a law enforcement training simulation scenario, a fire fighter training simulation scenario, a flight simulation scenario, a science education simulation scenario, a medical training simulation scenario, a medical response simulation scenario, an emergency response training scenario, an EMS training scenario, a triage training scenario, a paramedic training scenario, a mission rehearsal simulation scenario, or an architectural training simulation scenario, among others.

The method further includes: transmitting, by the simulation engine, the position data of the object to a modular symptoms generator of the virtual reality system, receiving, by the modular symptoms generator, the position data of the object, and querying, by the modular symptoms generator, a database to determine predefined position data for the object during the simulation scenario and based on a set of rules. The predefined position data comprises ideal position data for the object during the simulation scenario.

The method also includes: comparing, by the modular symptoms generator, the captured position data with the predefined position data for the object during the simulation scenario. In response to a determination that the position data for the object meets or exceeds the predefined position data, the method further includes: executing, by the modular symptoms generator, a first modification on a portion of the simulation scenario. In response to a determination that the position data for the object fails to meet or exceed the predefined position data, the method further includes: executing, by the modular symptoms generator, a second modification on a portion of the simulation scenario. The first modification differs from the second modification. Further, the first modification results in a first new simulation scenario and the second modification results in a second new simulation scenario. The first new simulation scenario is more favorable as compared to the second new simulation scenario. Additionally, the method may also include delivering electronic impulses to the user based on the user's actions.

DESCRIPTION OF THE PREFERRED EMBODIMENTS

Figure 1:
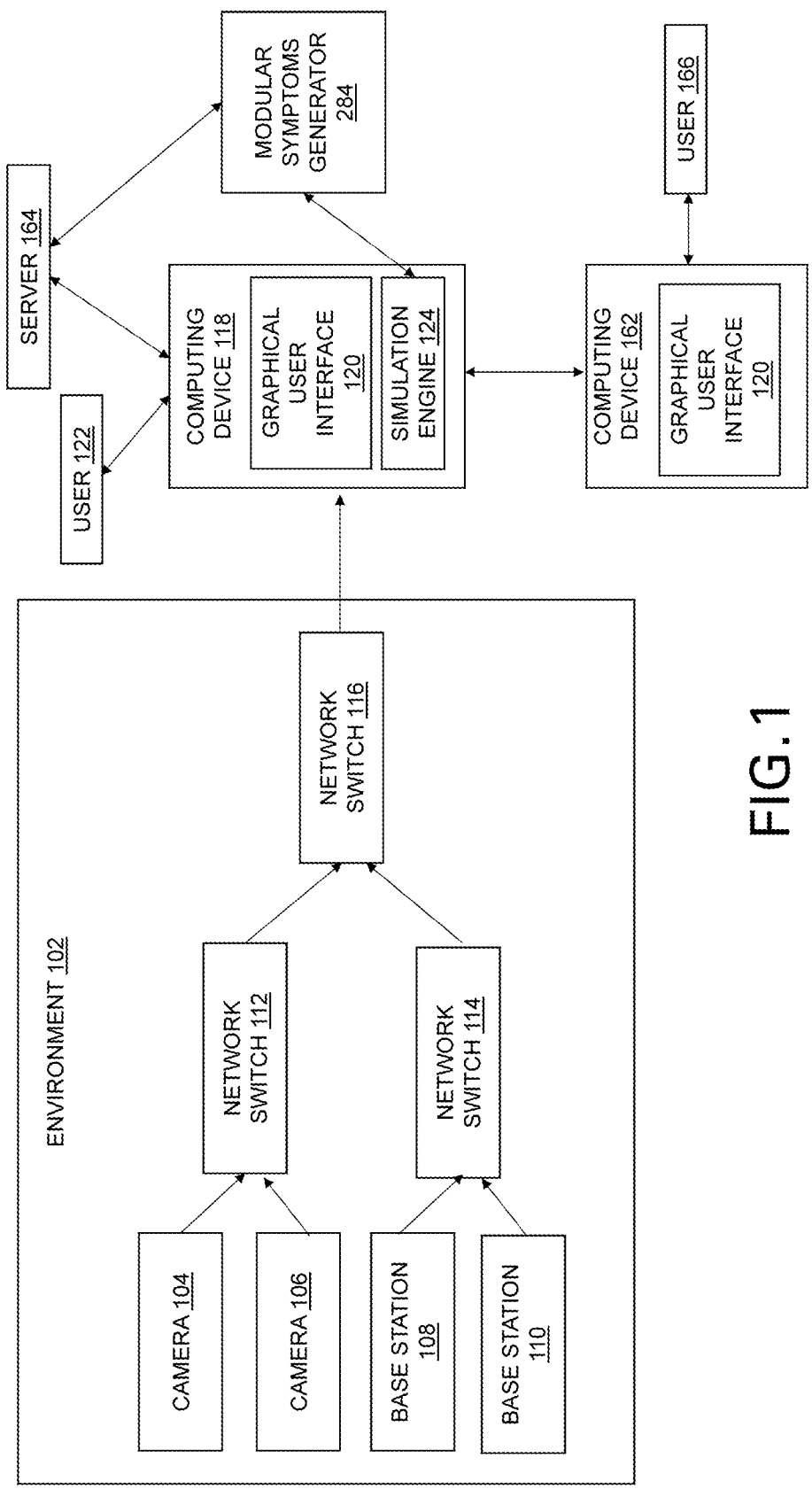
FIG. 1 depicts a block diagram of a VR system, according to at least some embodiments disclosed herein.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

As used herein, the singular forms "a," "an," and "the," are intended to include the plural forms as well, unless the context clearly indicates otherwise.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein, an "embodiment" means that a particular feature, structure or characteristic is included in at least one or more manifestations, examples, or implementations of this invention. Furthermore, the particular features, structures or characteristics may be combined in any suitable manner, as would be apparent to a person skilled in the art. Combinations of features of different embodiments are ail meant to be within the scope of the invention, without the need for explicitly describing every possible permutation by example. Thus, any of the claimed embodiments can be used in any combination.

The phrase "and/or," as used herein in the specification and in the claims, should be understood to mean "either or both" of the elements so conjoined, e.g., elements that are conjunctively present in some cases and disjunctively present in other cases. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Virtual reality (or "VR") is a technology for displaying a virtual environment to a user, where the virtual environment appears to be a real or true environment. The virtual image or image signal is generated by a computer or a computing device that allows the user or participant to dissociate himself or herself from a physical environment and act as if in the VR environment. A VR may include audio and haptic components, in addition to a visual component.

An example of one such VR system is described and depicted herein. The VR system may be embodied or implemented in a variety of devices, systems, and methods. The VR system includes a physical environment 102 (as depicted in FIG. 1, FIG. 2, FIG. 3, FIG. 4, and FIG. 12). The physical environment 102 is defined at least partially by a physical coordinate system. The physical coordinate system may be either two-dimensional (2D) (e.g., x, y) or three-dimensional (3D) (e.g., x, y, z). It should be appreciated that the physical environment 102 may be any space, such as an open room or a warehouse.

Figure 2:
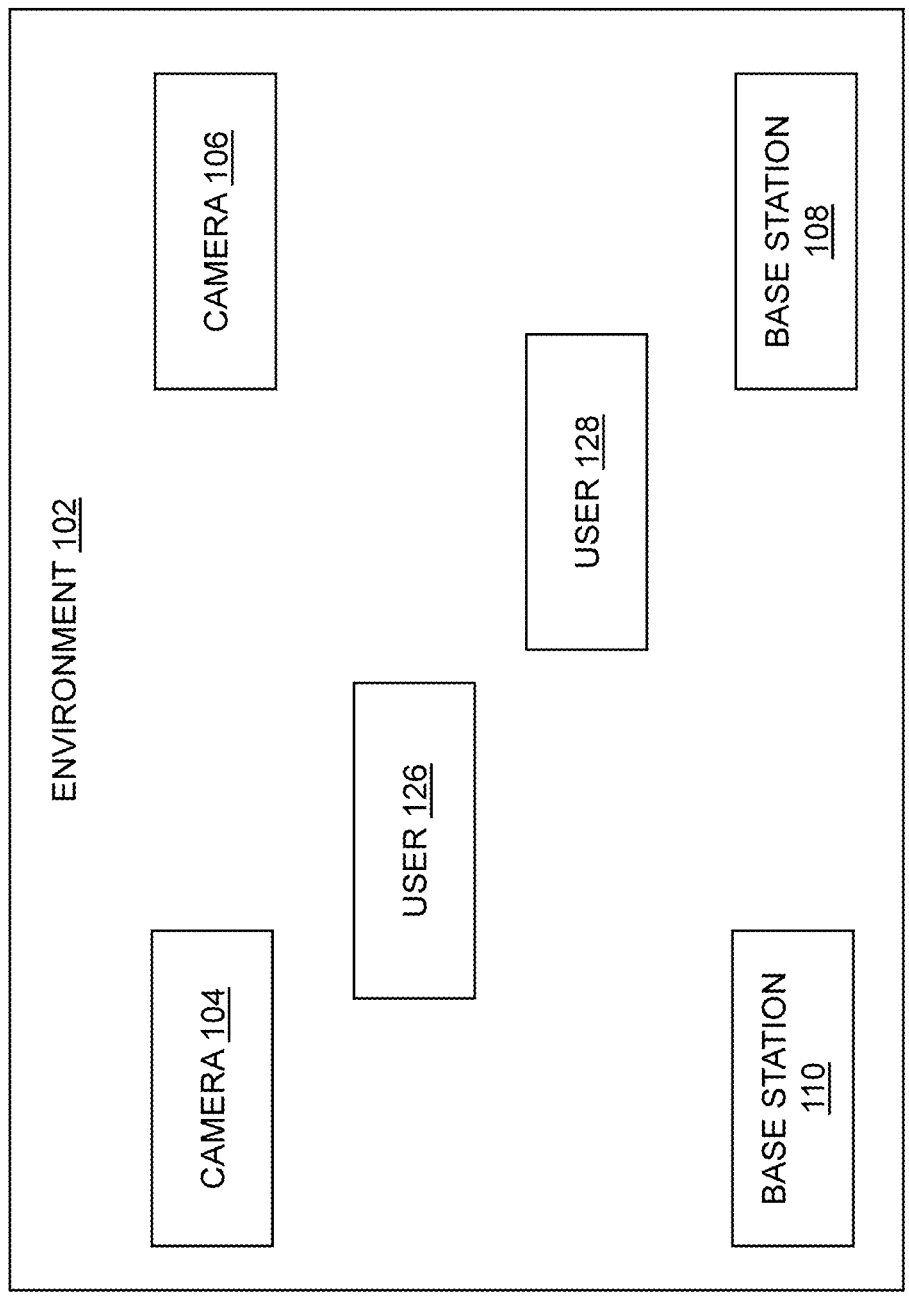
FIG. 2 depicts a block diagram of a physical environment of a VR system, according to at least some embodiments disclosed herein.
Figure 4:
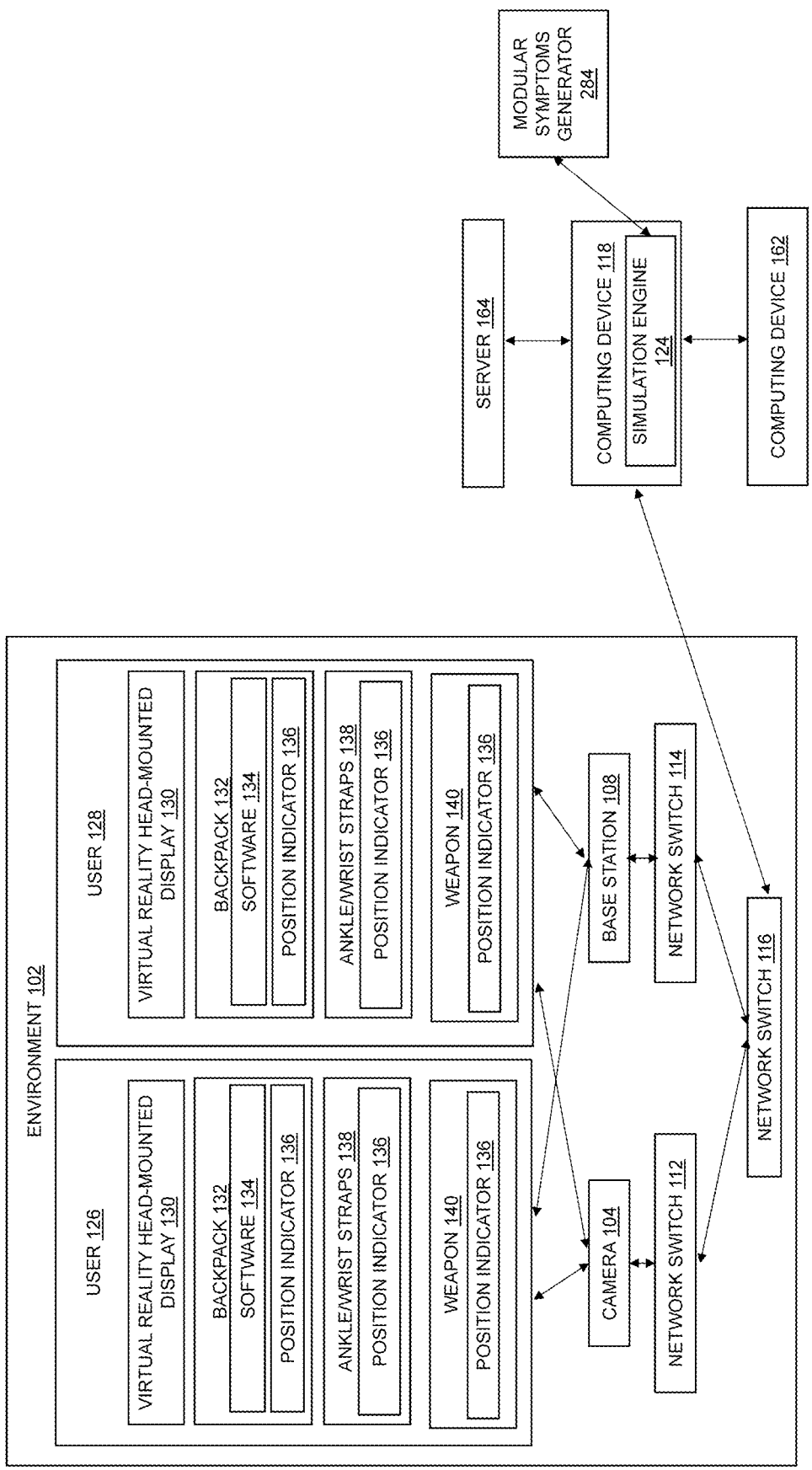
FIG. 4 depicts another block diagram of a VR system, according to at least some embodiments disclosed herein.

A plurality of objects may be located in the physical environment 102. The plurality of objects may each have a position on the physical coordinate system. The plurality of objects may include one or more cameras (such as a first camera 104 and/or a second camera 106) (as depicted in FIG. 1, FIG. 2, FIG. 4, and FIG. 12) and one or more base stations (such as a first base station 108 and/or a second base station 110) (as depicted in FIG. 1, FIG. 2, and FIG. 4). Each of the first camera 104 and the second camera 106 may be strategically placed around the physical environment 102 so as to monitor a portion of the physical environment 102 defined at least partially by the physical coordinate system. For example, the first camera 104 and the second camera 106 may be placed so that their views overlap the portion of the physical environment 102. An entirety of the physical environment 102 may be captured by the cameras.

In some examples, the first camera 104 and/or the second camera 106 may be motion capture cameras. It should further be appreciated that the first camera 104, the second camera 106, the first base station 108 and/or the second base station 110 may require pre-programming prior to use.

The base stations (such as the first base station 108 and the second base station 110) may be configured to emit signals (such as radio frequency signals) to synchronize a position indicator 136 or sensor (as depicted in FIG. 3, FIG. 4, FIG. 5, and FIG. 6) associated with objects within the physical environment 102. Each radio frequency channel of the first base station 108 and the second base station 110 must also be programmed to ensure that each of the first base station 108 and the second base station 110 is differentiated from one another.

Figure 3:
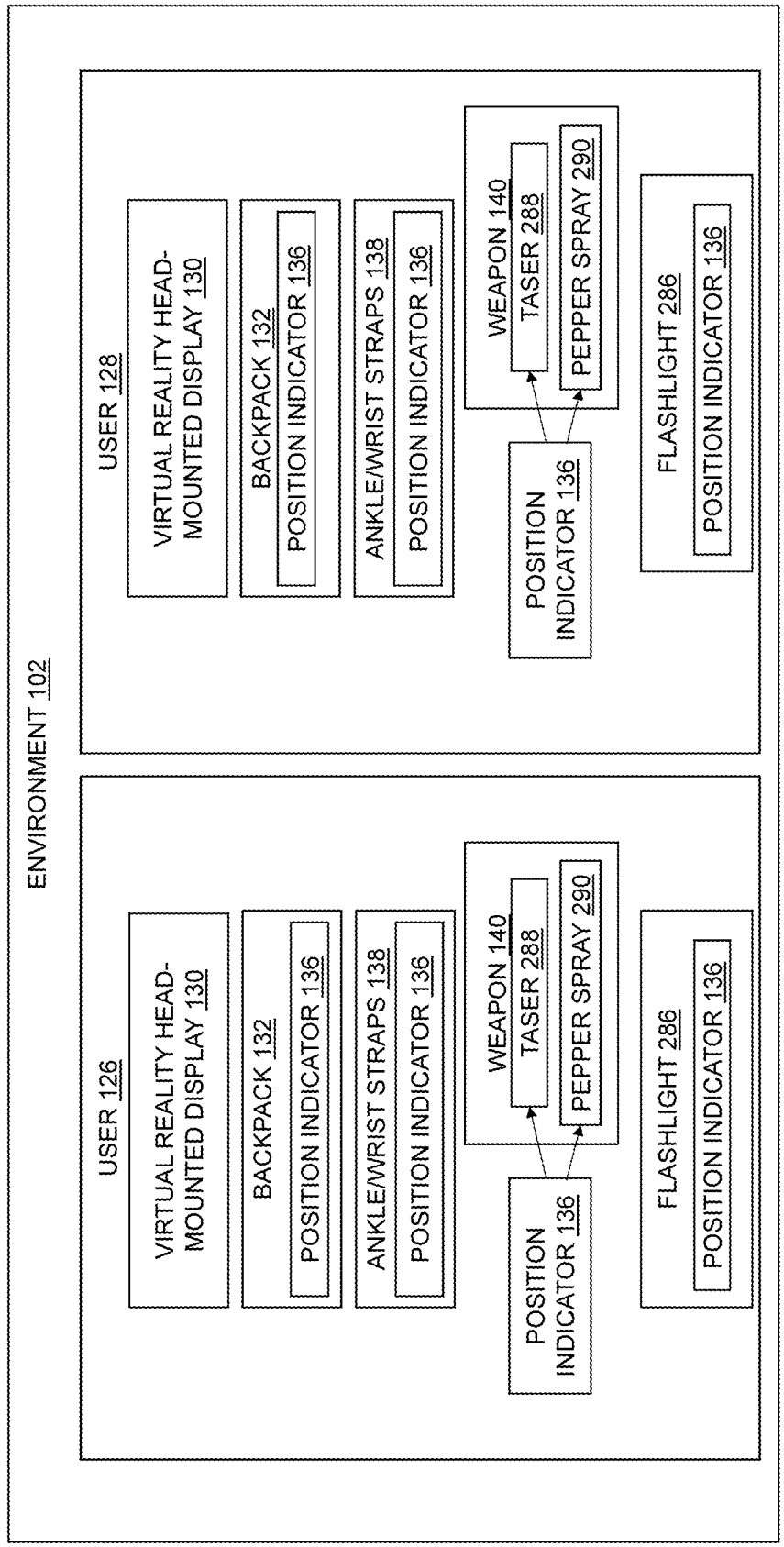
FIG. 3 depicts a block diagram of a first user and a second user within a physical environment of a VR system, the first user and the second user being associated with wearable devices and at least one weapon, according to at least some embodiments disclosed herein.
Figure 8:
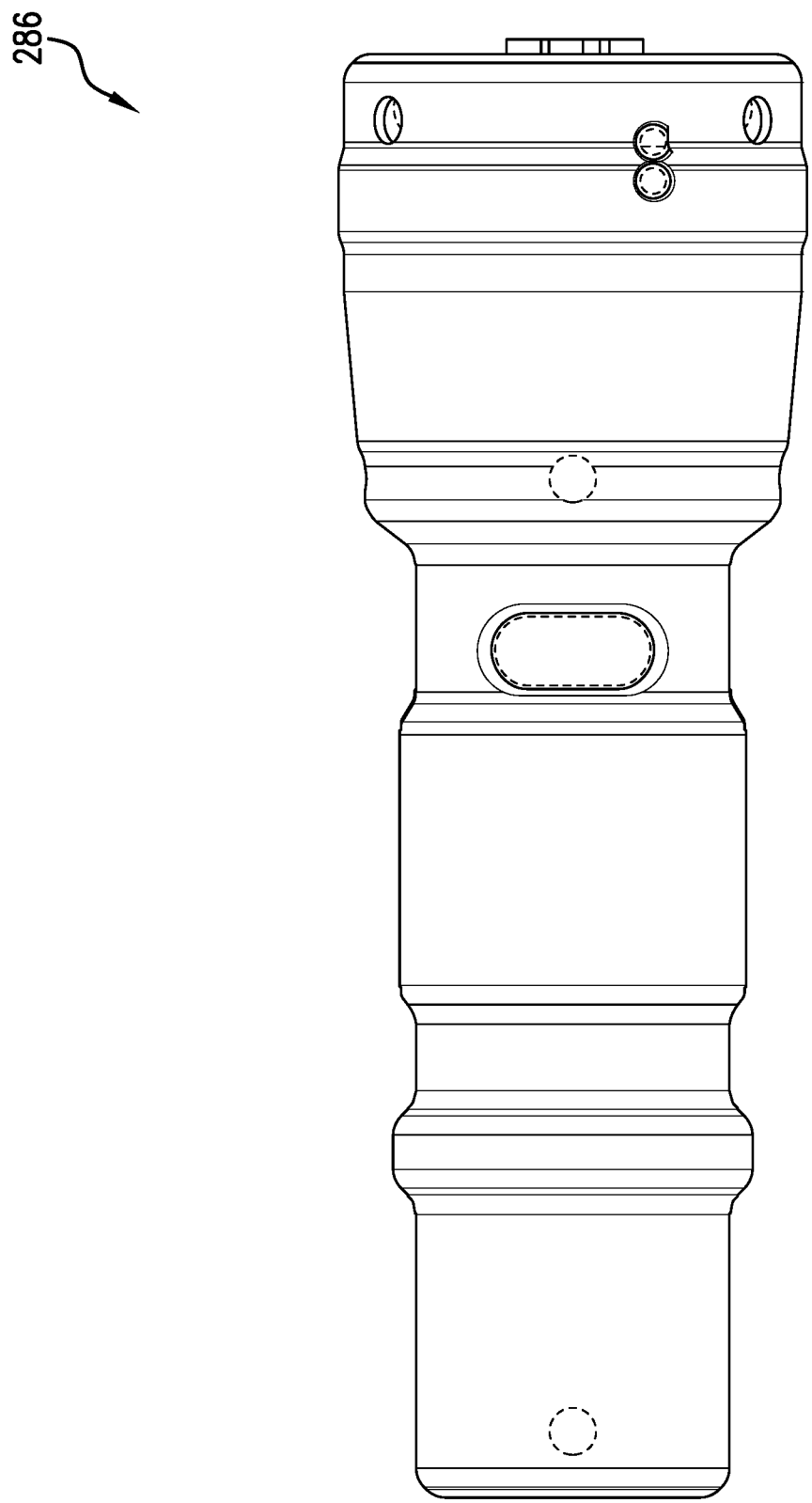
FIG. 8 depicts a schematic diagram of a VR flashlight for use in a VR system, according to at least some embodiments disclosed herein.
Figure 9:
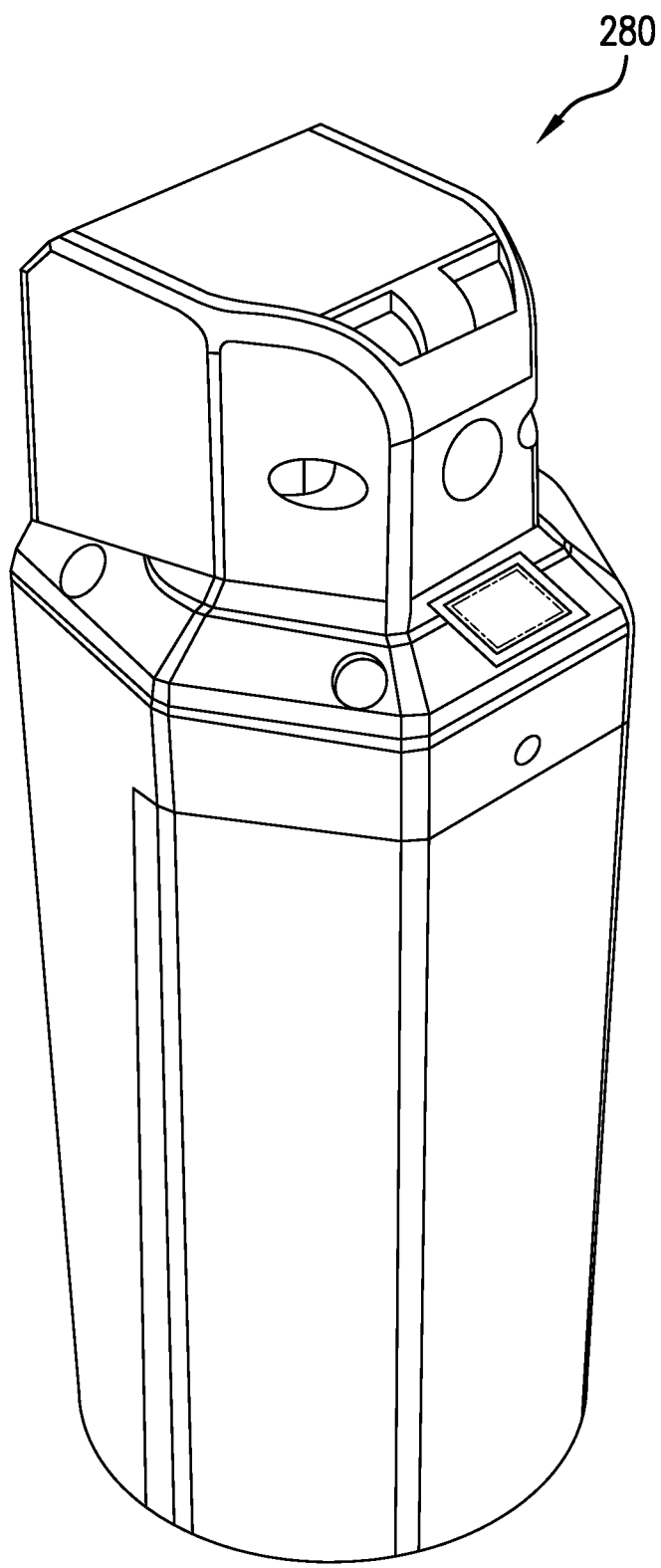
FIG. 9 depicts a schematic diagram of a VR pepper spray canister for use in a VR system, according to at least some embodiments disclosed herein.
Figure 10:
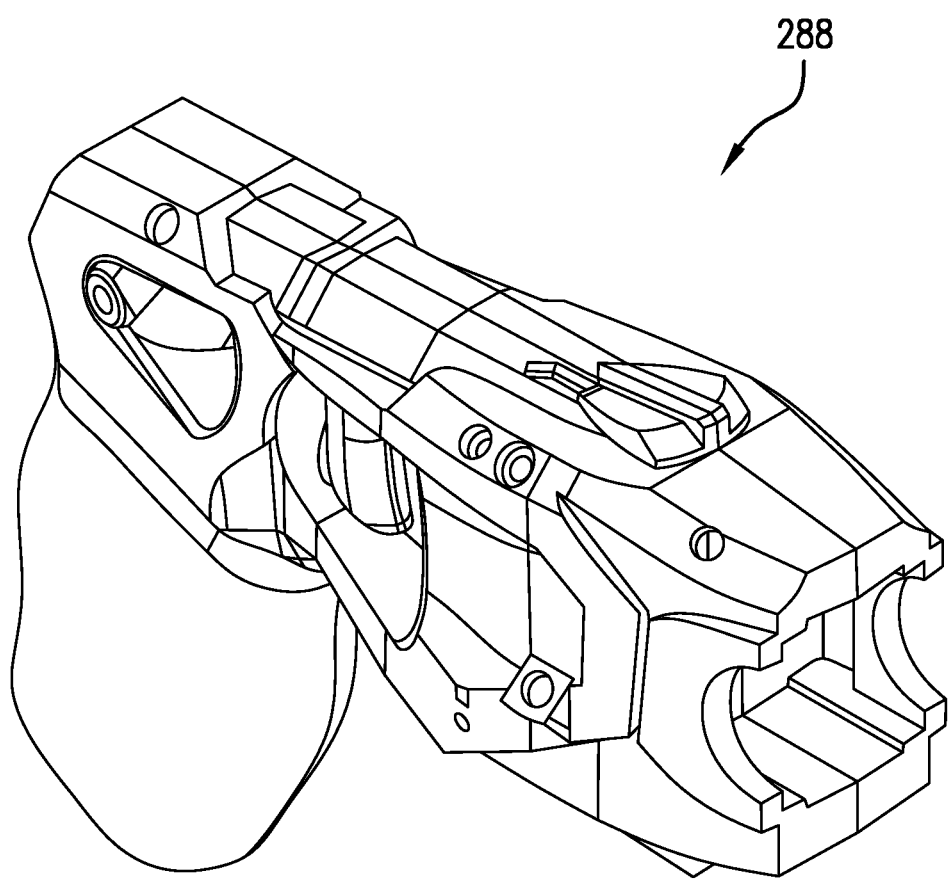
FIG. 10 depicts a schematic diagram of a VR taser for use in a VR system, according to at least some embodiments disclosed herein.
Figure 11:
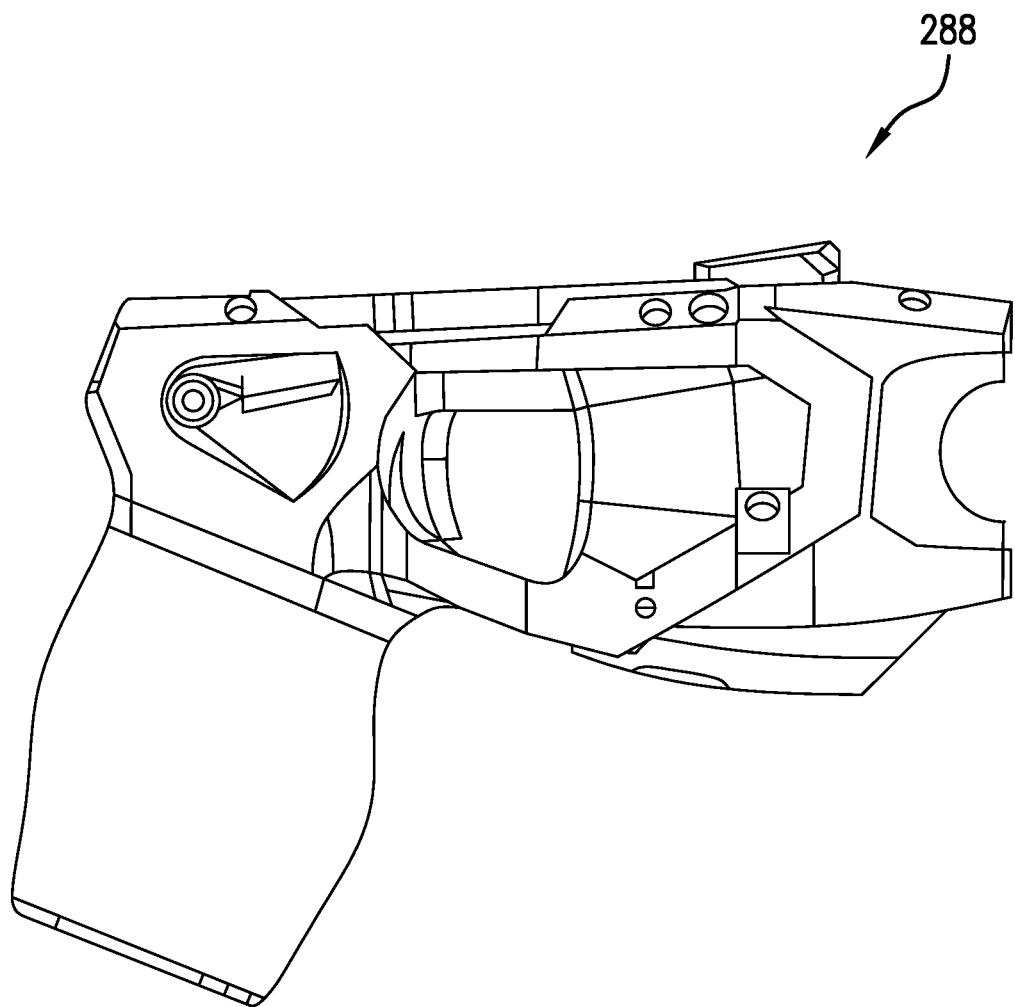
FIG. 11 depicts a schematic diagram of a VR taser for use in a VR system, according to at least some embodiments disclosed herein.
Figure 12:
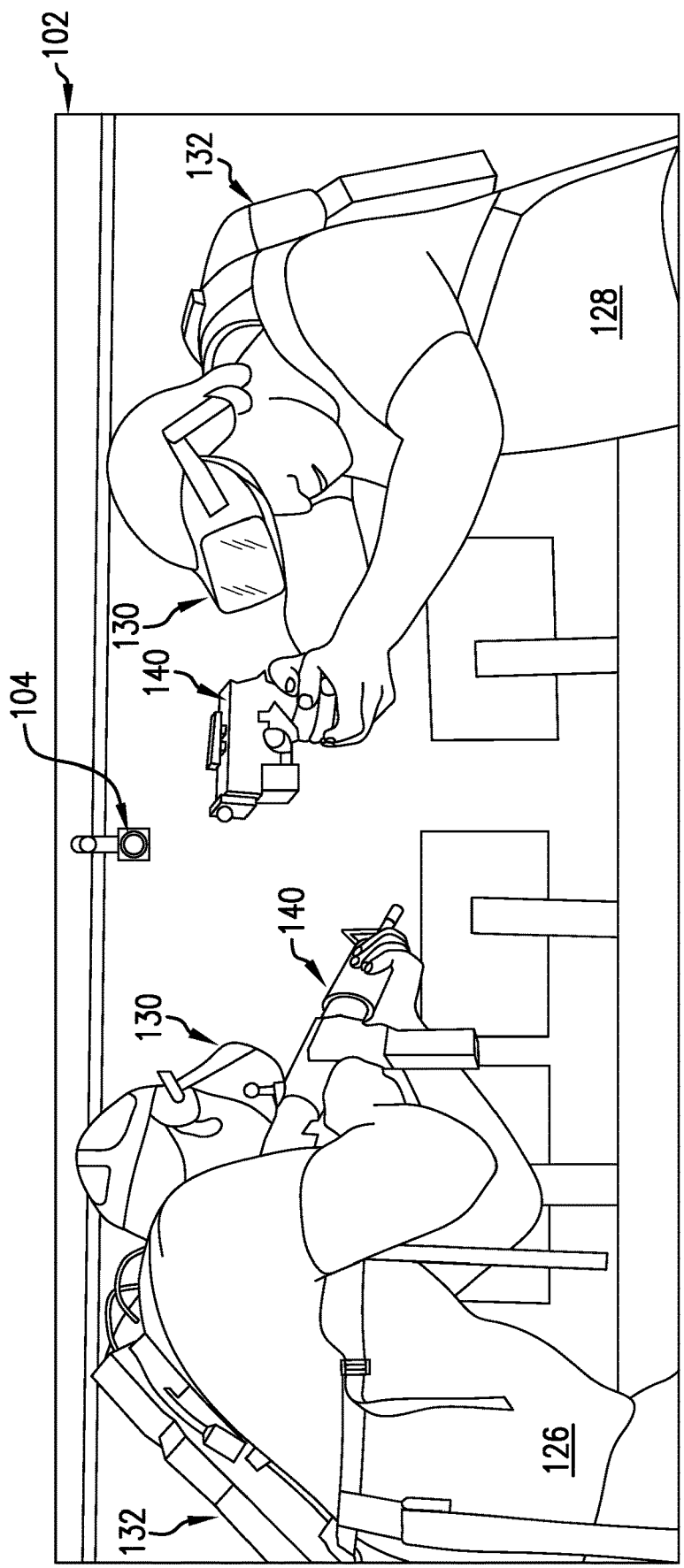
FIG. 12 depicts a schematic diagram of a first user and a second user within a physical environment of a VR system, the first user and the second user being associated with wearable devices and at least one weapon, according to at least some embodiments disclosed herein.

As described herein, objects 150 (of FIG. 14) may include a first user 126, a second user 128, other users, one or more wearable devices worn by one or more of the users, a peripheral or weapon 140 of FIG. 3 used by one or more of the users, and/or a physical object (e.g., a flashlight 286 (of FIG. 8), a doorway, a wall, a ceiling, a floor, a doorknob, a steering wheel, a step, a surface, a freely movable object, a desk, a table, and/or a door), among other examples not explicitly listed herein. The weapon 140 may include a taser 288 (of FIG. 10 and FIG. 11), pepper spray 290 (of FIG. 9), a gun, etc. In examples, the one or more wearable devices may include: a backpack 132, a head-mounted display 130, and one or more ankle/wrist straps 138, among other examples not explicitly listed herein.

Figure 5:
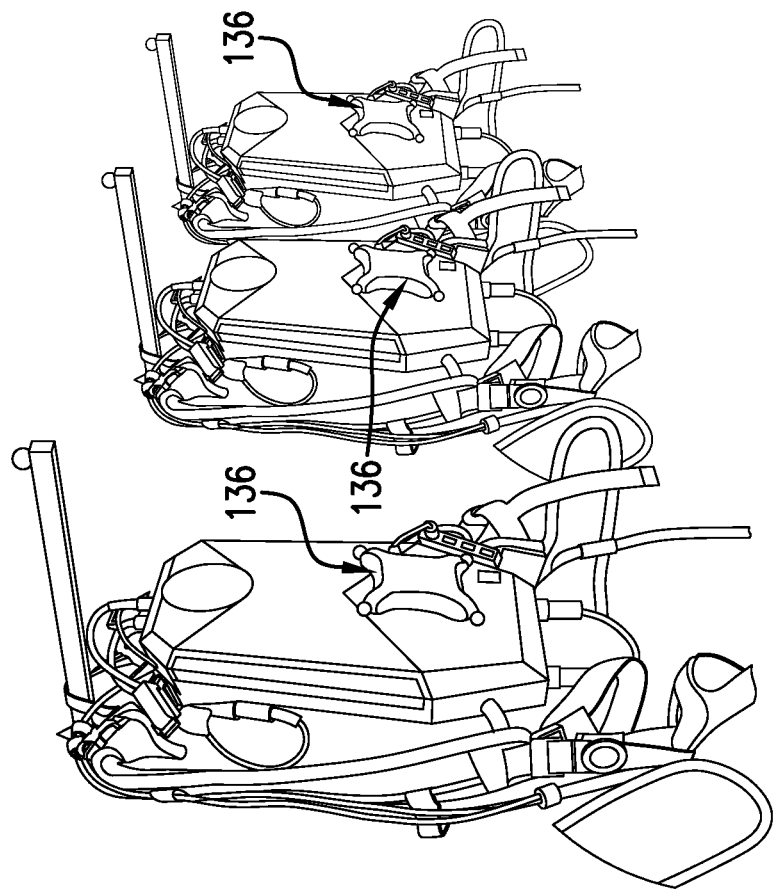
FIG. 5 depicts a schematic diagram of a backpack comprising a position indicator for use in a VR system, according to at least some embodiments disclosed herein.
Figure 5:
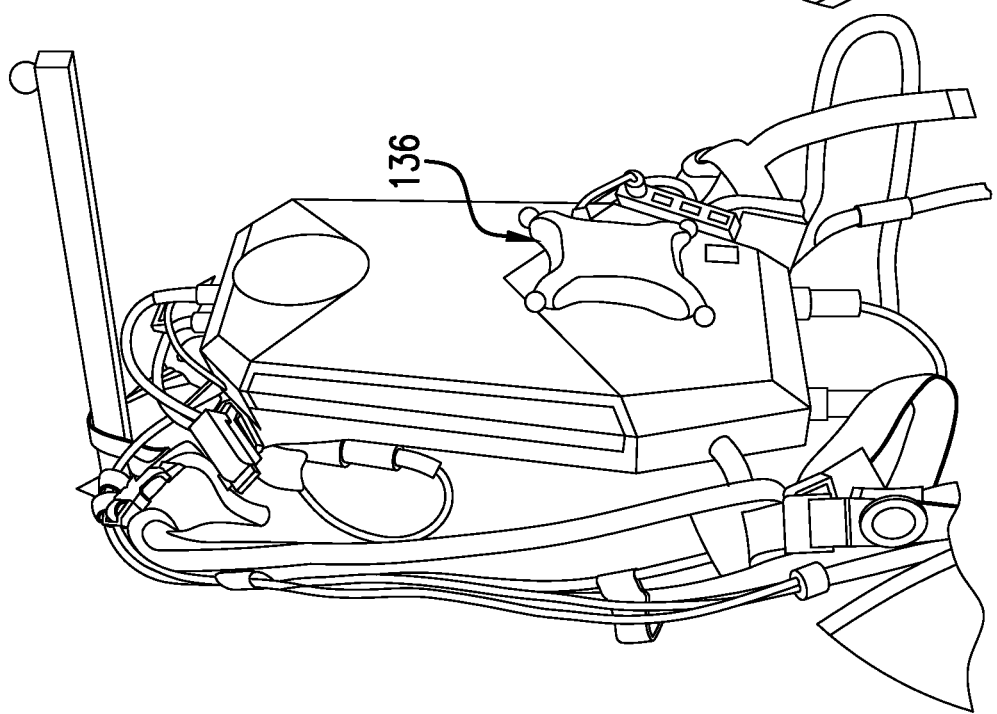
Figure 6:
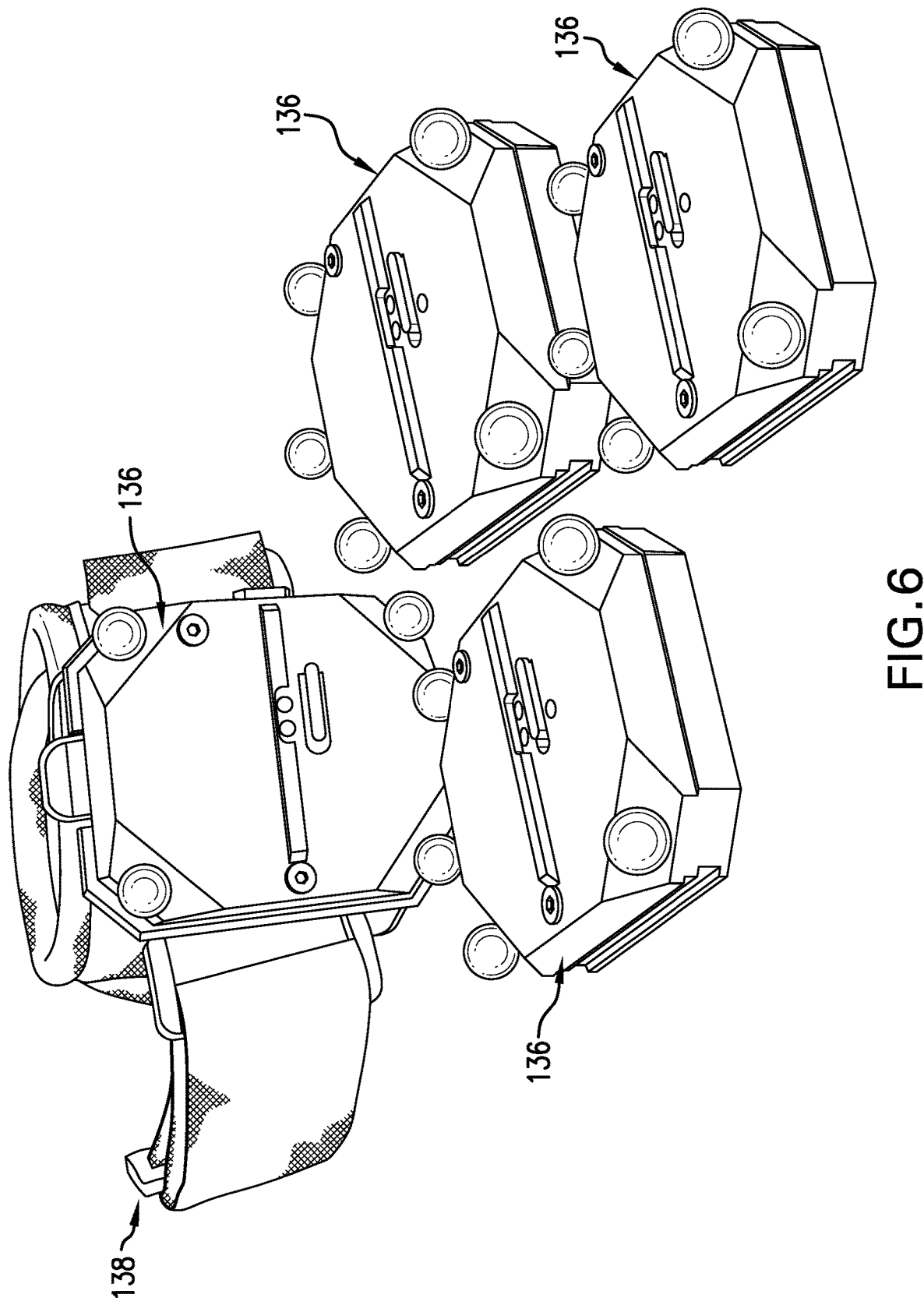
FIG. 6 depicts a schematic diagram of an ankle/wrist strap comprising a position indicator for use in a VR system, according to at least some embodiments disclosed herein.
Figure 7:
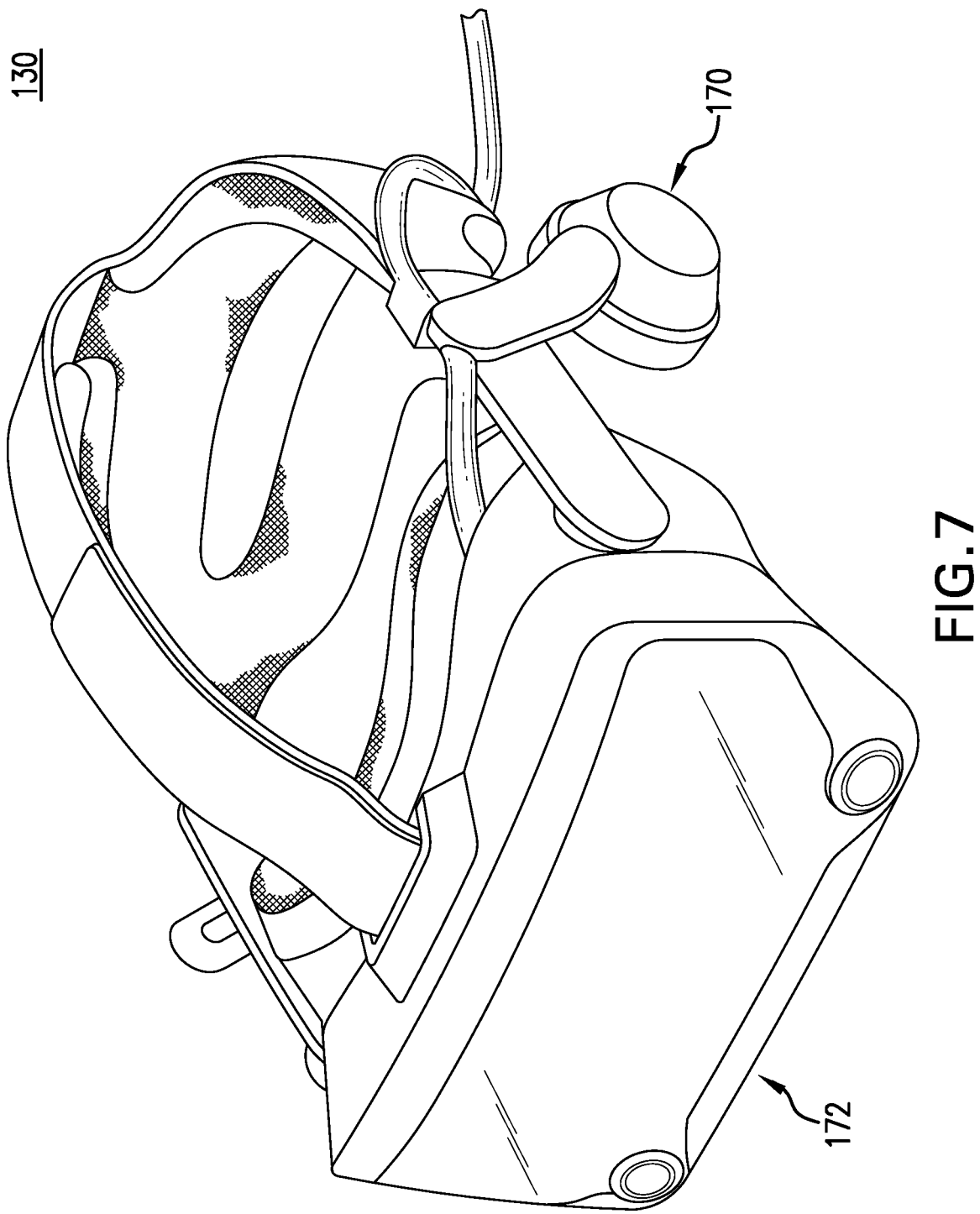
FIG. 7 depicts a schematic diagram of a head-mounted display for use in a VR system, according to at least some embodiments disclosed herein.

The first user 126 and the second user 128 are depicted, at least, in FIG. 2, FIG. 3, FIG. 4, and FIG. 12. The weapon 140 is depicted, at least, in FIG. 3, FIG. 4, and FIG. 12. The backpack 132 is depicted in FIG. 3, FIG. 4, FIG. 5, and FIG. 12. The head-mounted display 130 is depicted in FIG. 3, FIG. 4, FIG. 7, and FIG. 12. The one or more ankle/wrist straps 138 are depicted in FIG. 3, FIG. 4, and FIG. 6.

The first camera 104 and/or the second camera 106 may be affixed to a first network switch 112 via cabling, such as an Ethernet cable. The first network switch 112 may also be configured to supply power to each of the first camera 104 and/or the second camera 106. The first base station 108 and the second base station 110 may be affixed to a second network switch 114 via cabling, such as the Ethernet cable. A third network switch 116 may be affixed to the first network switch 112 and the second network switch 114. The first network switch 112, the second network switch 114, and the third network switch 116 are depicted in FIG. 1 and FIG. 4.

In additional examples, the VR system described herein is a free-roaming VR system such that one or more users (e.g., the first user 126 and/or the second user 128) may walk around freely in the physical coordinate system while engaging with the VR system without the limits of obstructive cables or constraints. As such, the VR system allows for a fully immersive experience for single or multi-participant use. It should be appreciated that a quantity of users engaging with the VR system during a time period is non-limiting.

In examples, the volume of the physical environment 102 must be calibrated prior to use of the VR system. Additionally, prior to use of the VR system, a boundary of the physical environment 102 for a scenario 148 (of FIG. 14-FIG. 21) must be determined to ensure that the in game boundary that appears when the first user 126 and/or the second user 128 get too close to the end of the physical space match the physical space.

As explained, other objects (e.g., the doorway, the wall, the ceiling, the floor, etc.) may be present in the physical environment 102, each of which have a position on the physical coordinate system. The first user 126 and/or the second user 128 may engage with the object (e.g., the doorway) when engaging with the free-roaming VR system. It should be appreciated that a position indicator 136 may be associated with or affixed to each of one or more physical objects (such as the backpack 132, the head-mounted display 130, the one or more ankle/wrist straps 138, the weapon 140, the doorway, the wall, the ceiling, the floor, and/or the doorknob, etc.). A shape and size of the position indicator 136 is not limited to the shape and size depicted herein. In other examples, the backpack 132 may comprise an electronic device. As depicted in FIG. 4, software 134 may be executable on the electronic device to assist in the VR system.

The position indicator 136 may be affixed to each of the one or more physical objects via Velcro, an adhesive, a strap, a clasp, a zipper, or another method. As an illustrative example, the position indicator 136 may be affixed to the backpack 132 via Velcro (as depicted in FIG. 5). In another example, the position indicator 136 may be affixed to the one or more ankle/wrist straps 138 via a strap (as depicted in FIG. 6). In other examples, the position indicator 136 may be incorporated into the one or more physical objects. It should be appreciated that these examples are provided for illustrative purposes only and other examples are contemplated. It should be appreciated that biometric sensors may be used in addition to, or alternative to, the position indicator 136. The appropriately placed position indicators 136 allow the VR system to track movements of the wearer/user (e.g., the first user 126 and/or the second user 128) to allow natural interaction with content.

Each of the first camera 104 and the second camera 106 are configured to capture position data of the position indicator 136 within the portion of the physical environment 102. The position indicator 136 may identify a location, may track, and/or may detect a movement of the one or more physical objects within the portion of the physical environment 102. The first camera 104 and the second camera 106 may transmit the position data of each position indicator 136 within the portion of the physical environment 102 to the first network switch 112.

Figure 14:
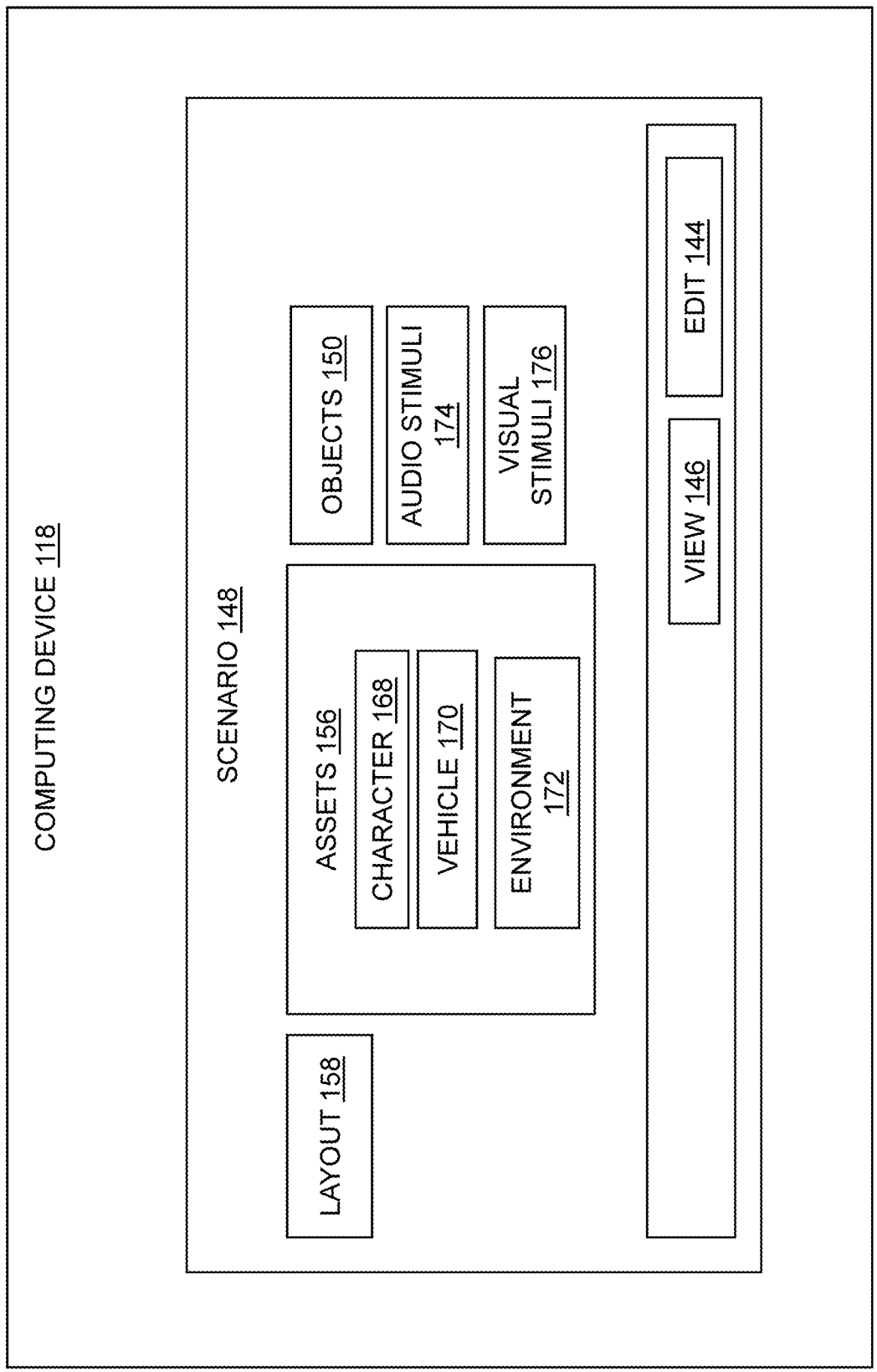
FIG. 14 depicts a block diagram of a scenario displayed on a computing device, according to at least some embodiments disclosed herein.
Figure 15:
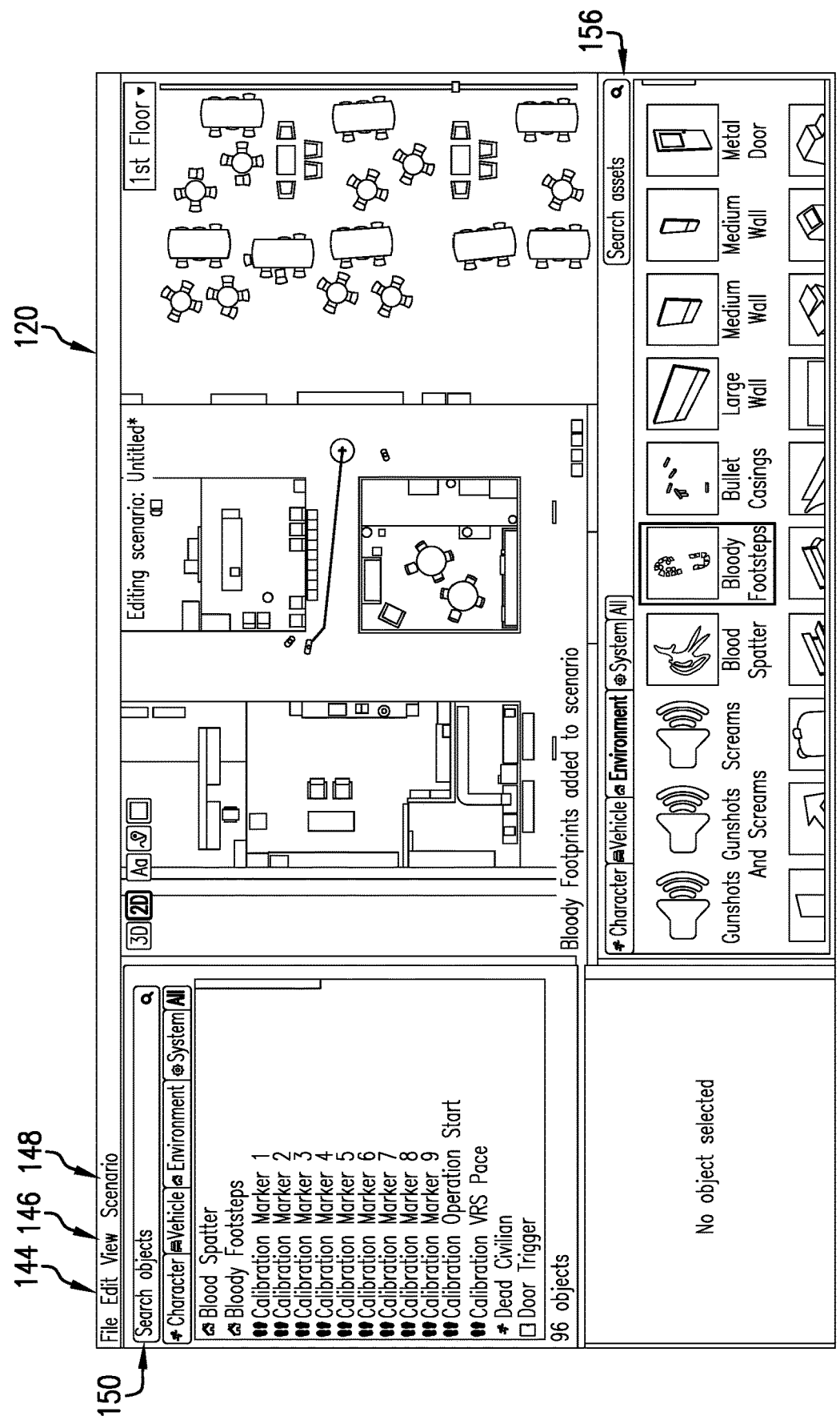
FIG. 15-FIG. 21 depict schematic diagrams of scenarios rendered by a simulation engine of a computing device and displayed to a user via a graphical user interface (GUI) of the computing device, according to at least some embodiments disclosed herein.
Figure 16:
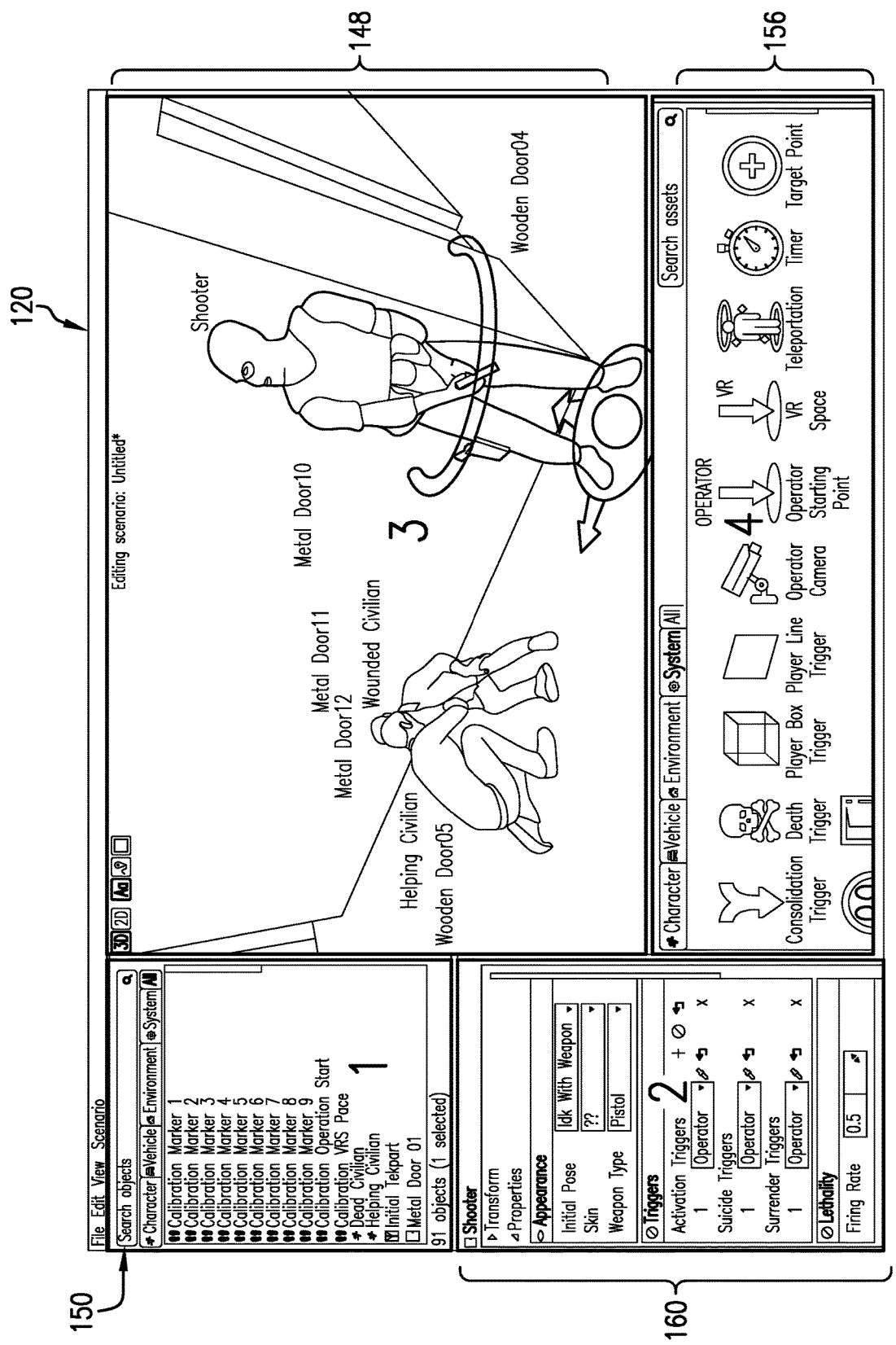
Figure 17:
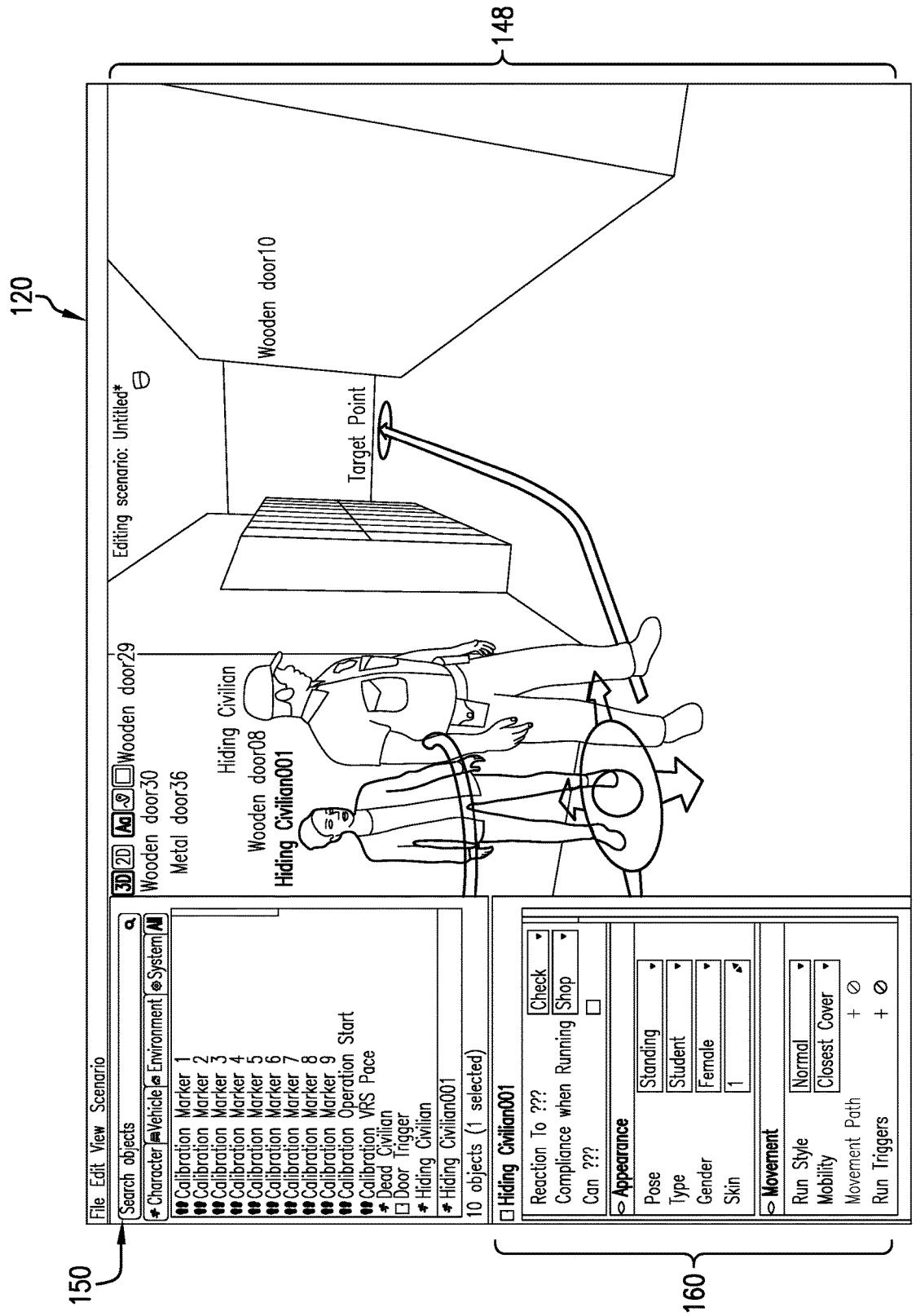
Figure 18:
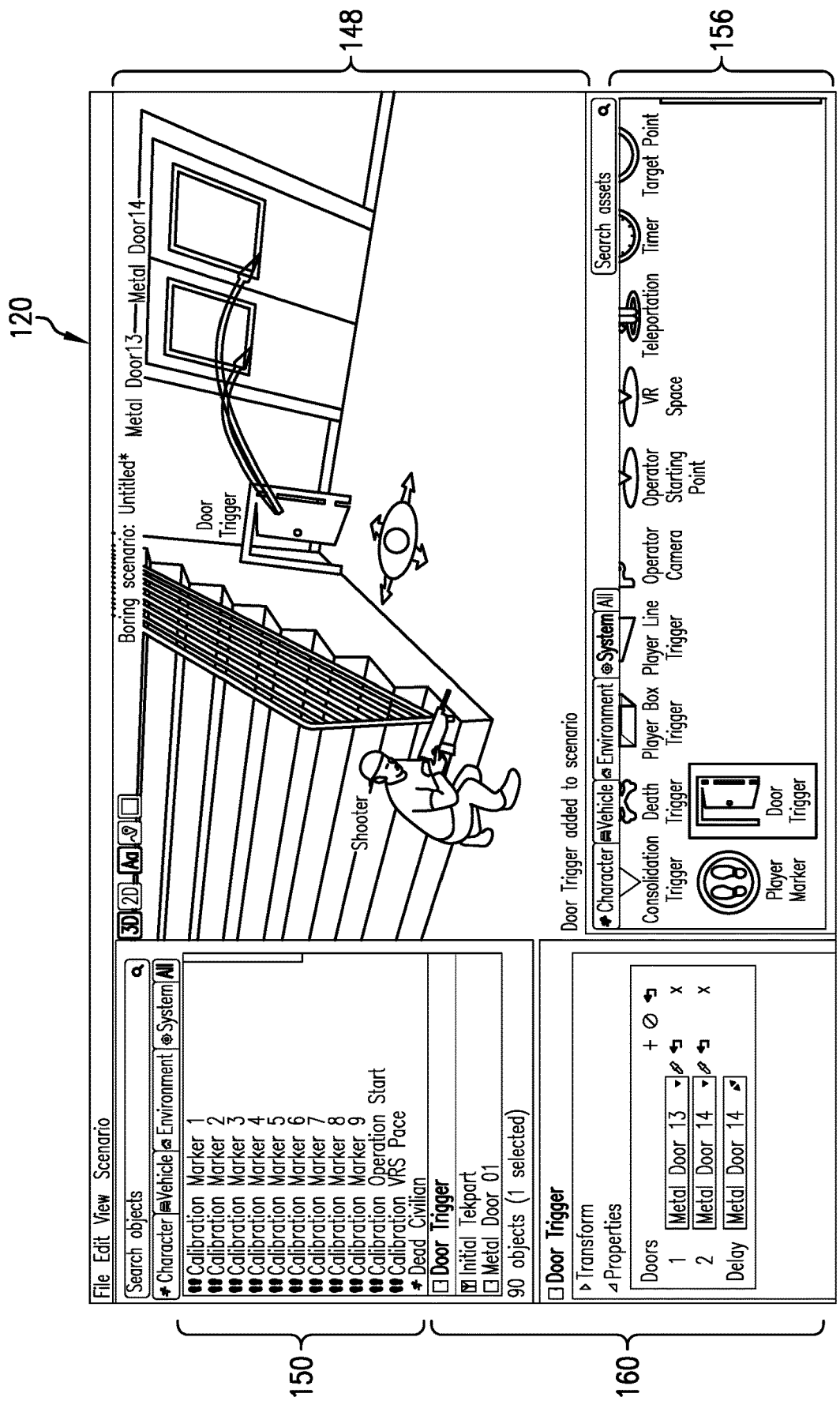
Figure 19:
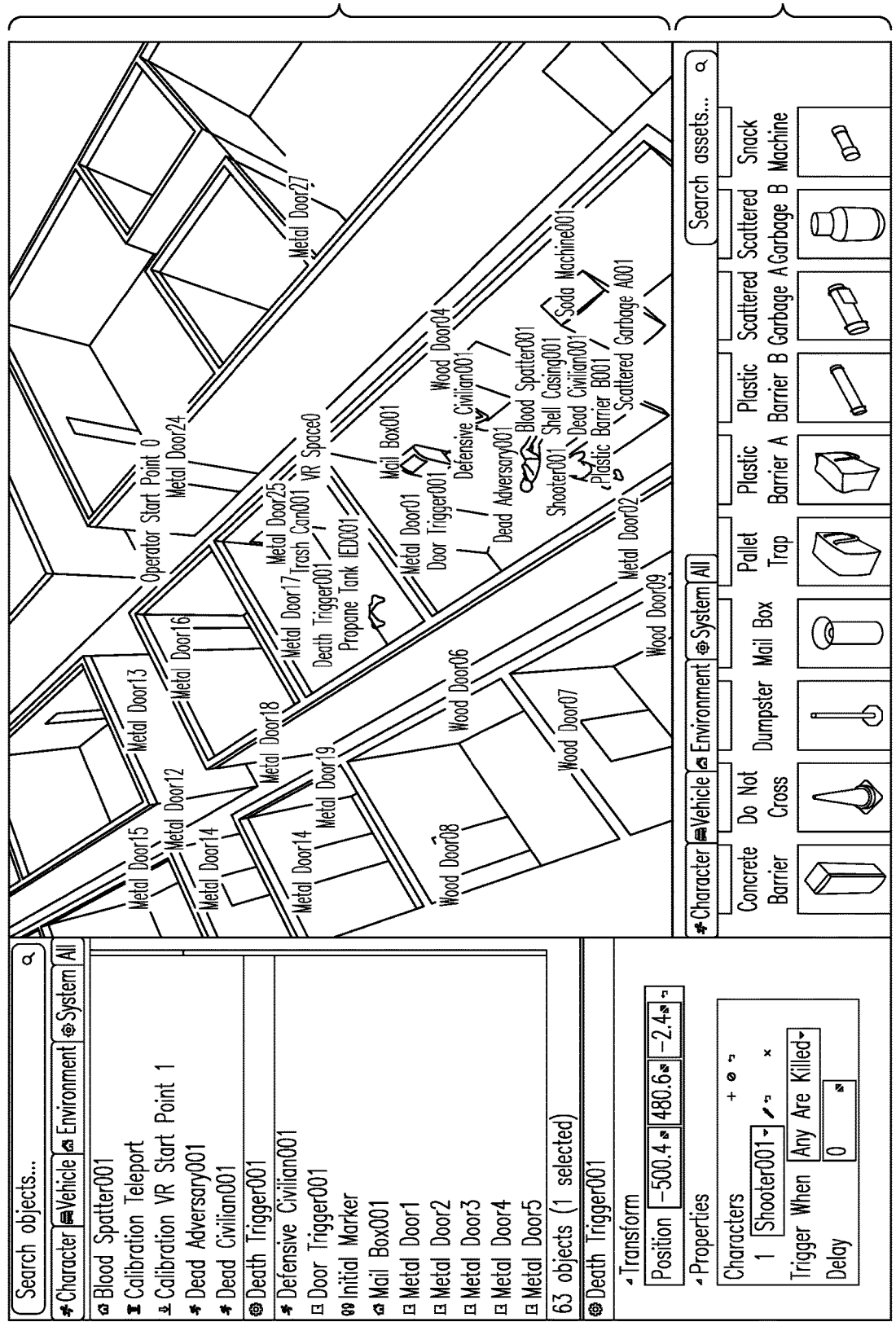

As described, the first network switch 112 may transmit the position data of each position indicator 136 to the third network switch 116, where the third network switch 116 may be configured to transmit the position data of each position indicator 136 to a first computing device 118 (of FIG. 1, FIG. 4, and FIG. 14). It should be appreciated that the examples provided herein describe hardwiring. However, it should be appreciated that wireless options are contemplated herein. Moreover, it should be appreciated that a quantity of the cameras, the base stations, and the network switches is not limited to the illustrative examples disclosed herein. Each of the cameras (e.g., the first camera 104 and the second camera 106) may be balanced across the network switches to balance power consumption. For example, an OptiTrack 24-port Gigabit PoE/PoE+ switch for use with Ethernet cameras supports up to 23 PoE cameras (Prime13, Prime13 W, Slim 13E) or 12 PoE+ cameras (Prime41, Prime17 W) per network switch.

The first computing device 118 may comprise a simulation engine 124 (of FIG. 1 and FIG. 4) and a graphical user interface (GUI) 120 (of FIG. 1), among other components. In some examples, the simulation engine 124 is an application, a software program, a service, or a software platform executable on the first computing device 118. In examples where the simulation engine 124 is the application, a development stack may be used for application deployment. It should be appreciated that "deployment stack" refers to the set of languages, libraries, integrated development environments (IDEs) and tools (including OS, database server and application server) used for application development.

Figure 20:
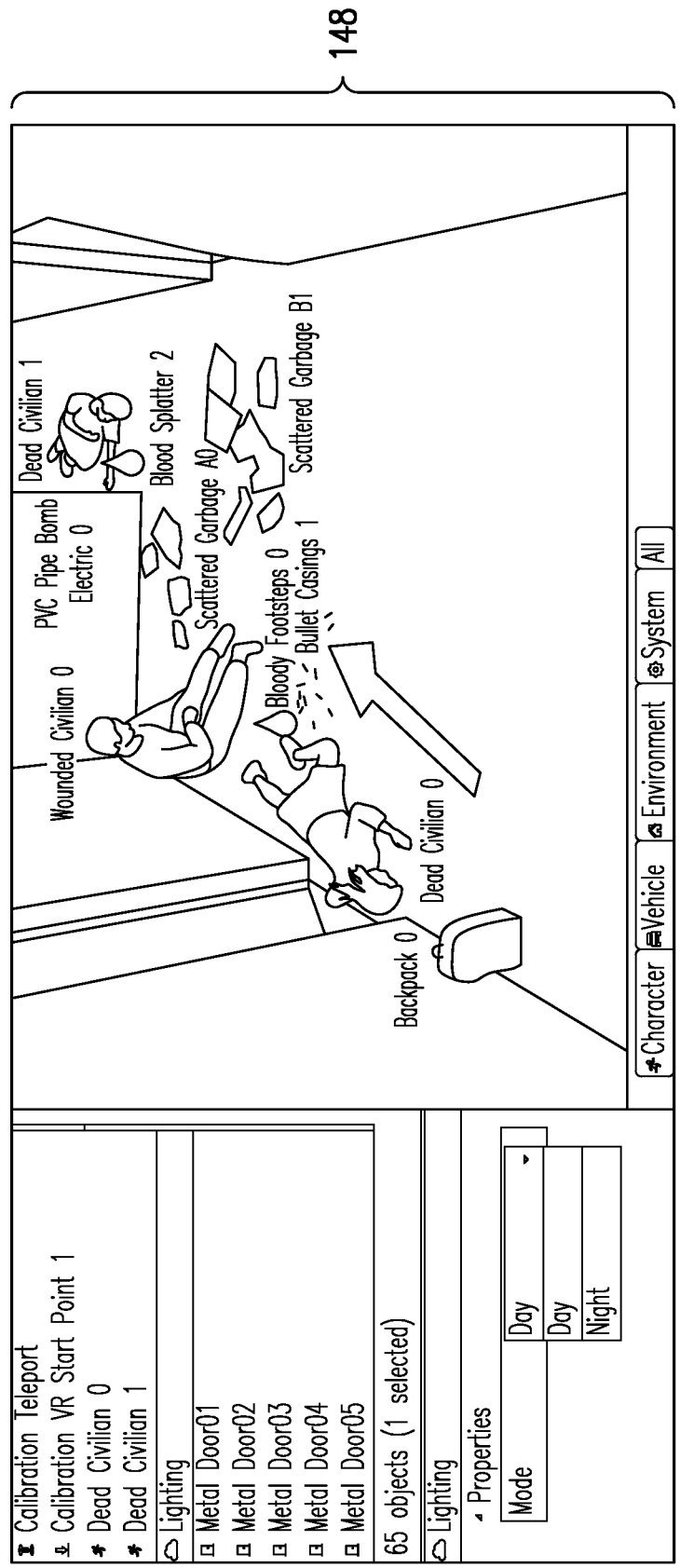
Figure 21:
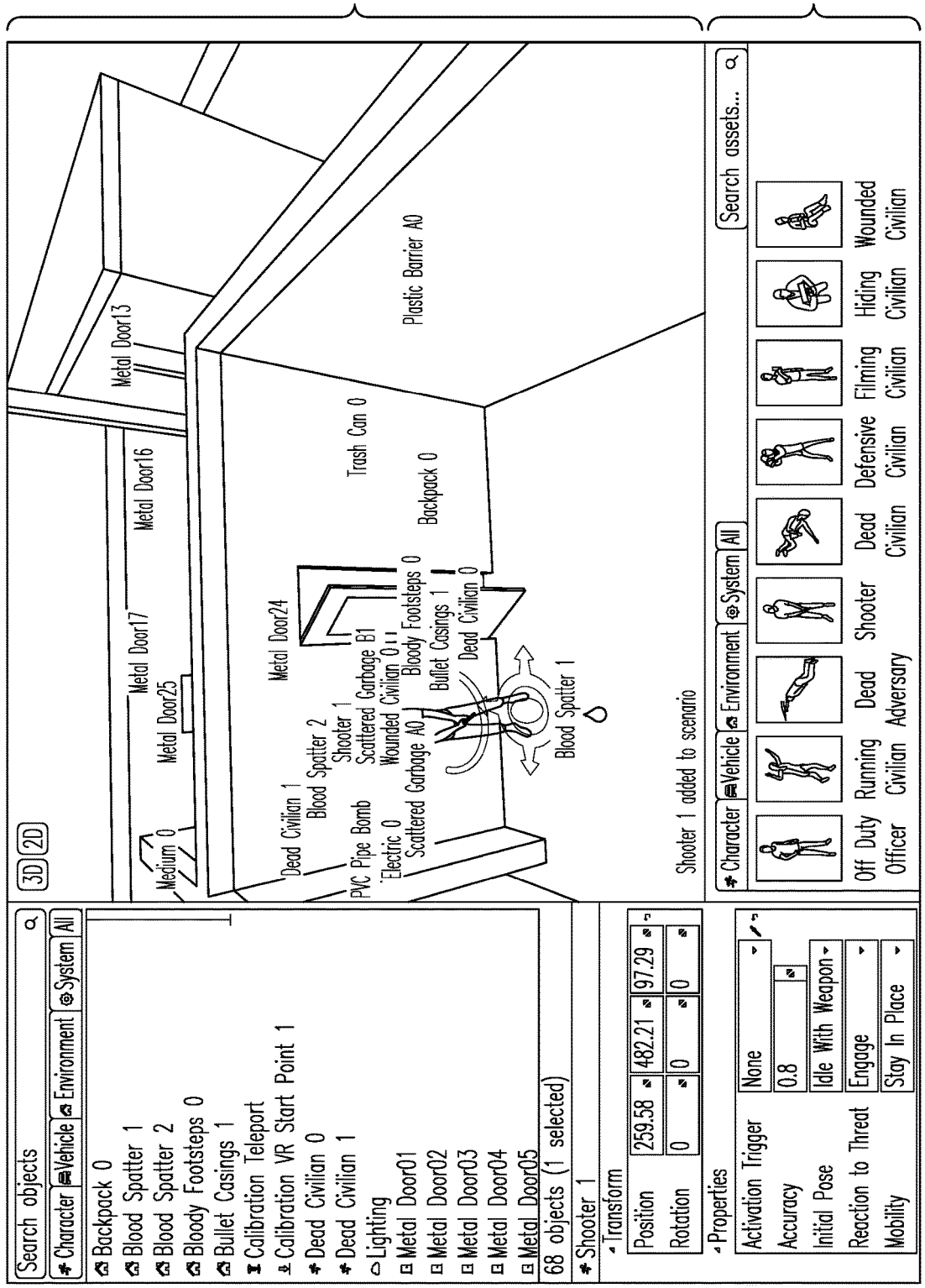
Figure 22:
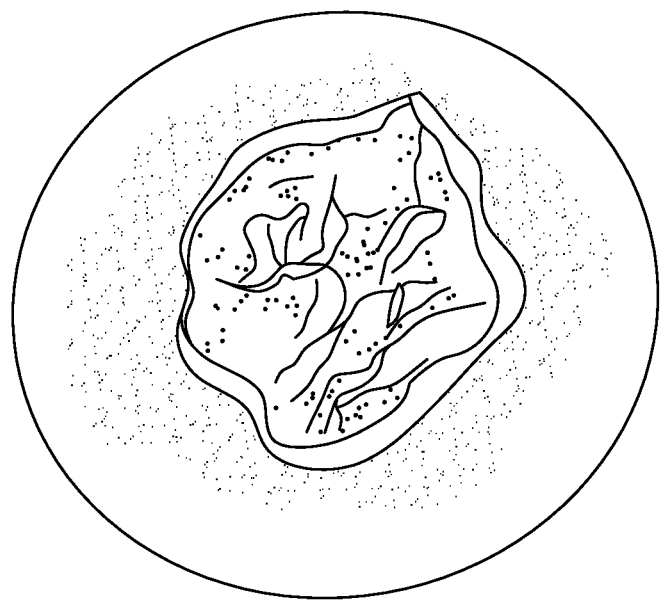
FIG. 22-FIG. 24 depict schematic diagrams of wounds used in a scenario of the VR system, according to at least some embodiments disclosed herein.
Figure 22:
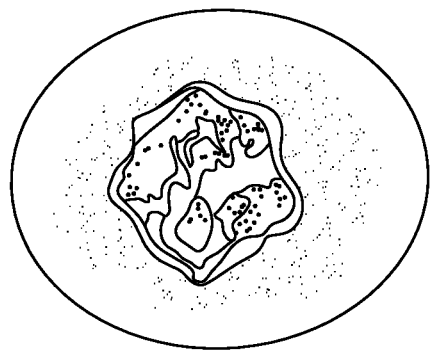
Figure 22:
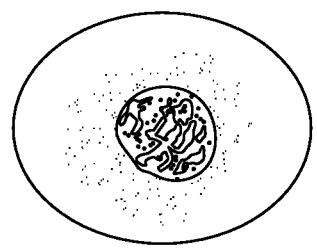
Figure 23:
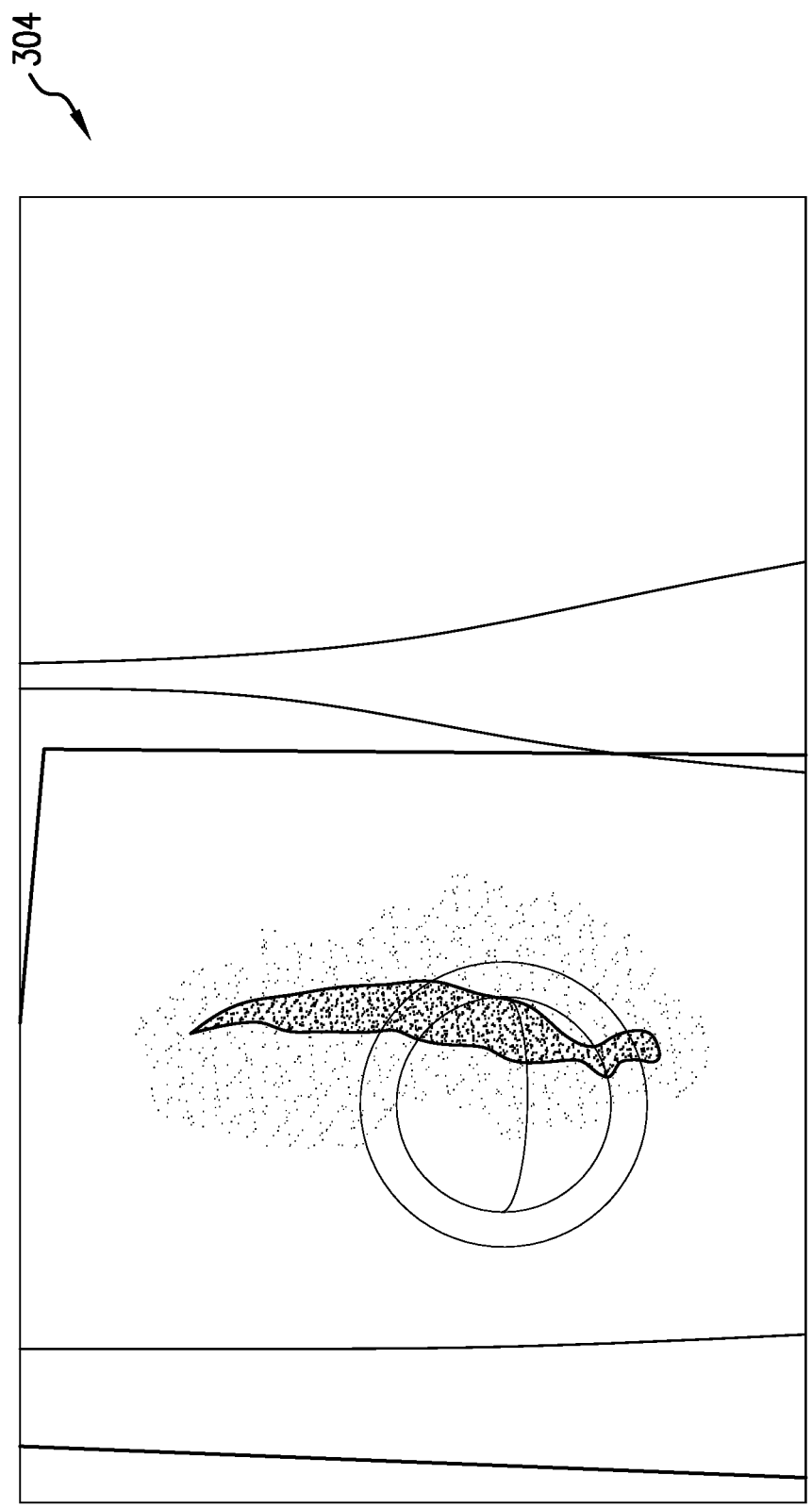
Figure 24:
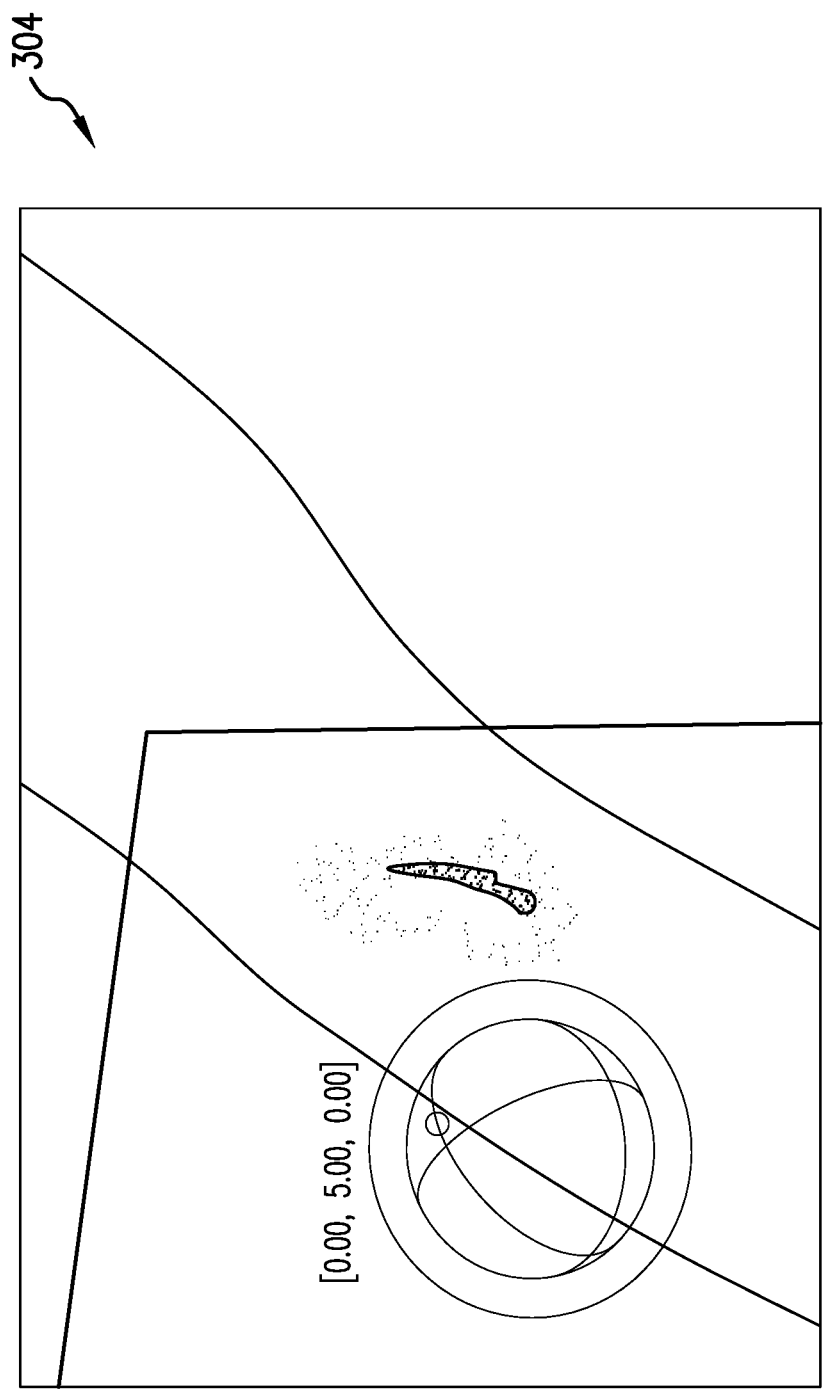
Figure 25:
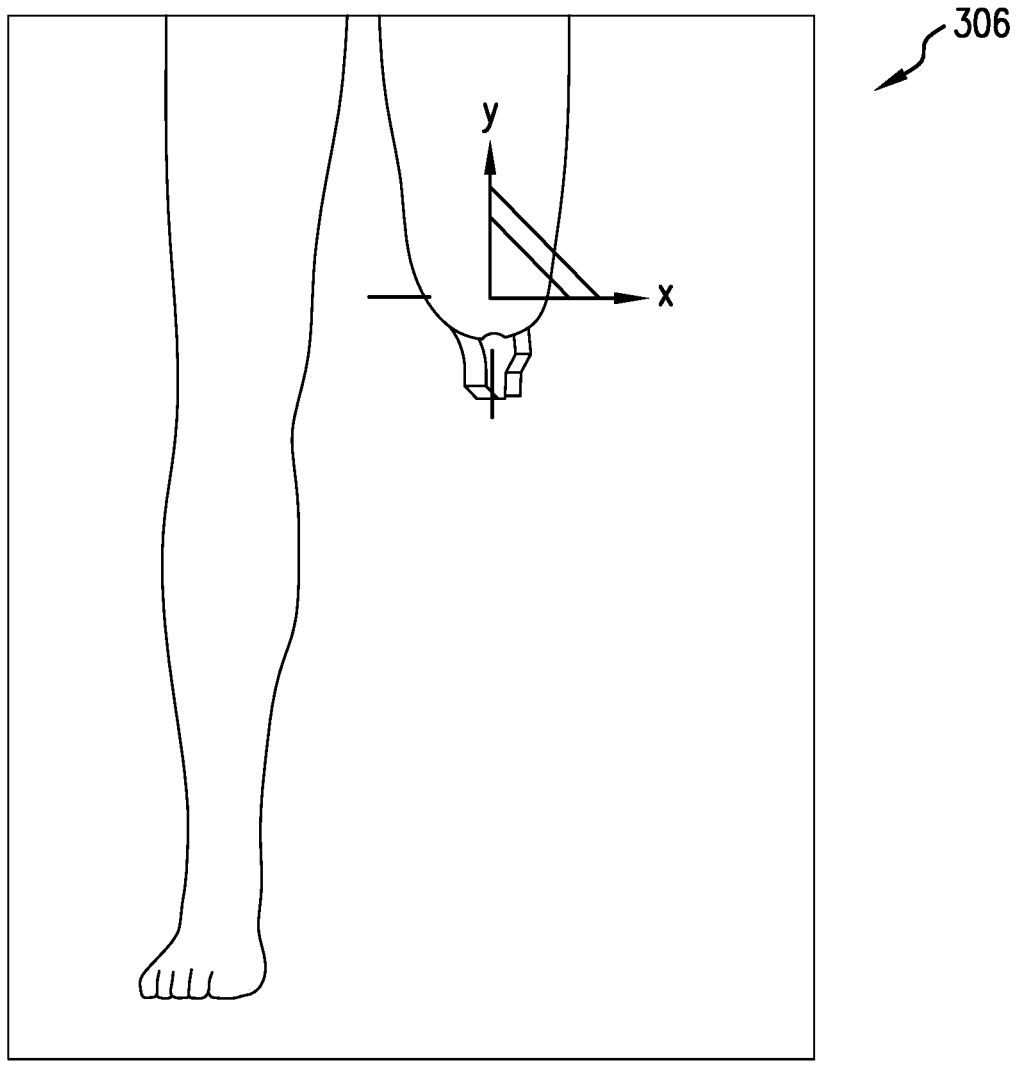
FIG. 25 depicts a schematic diagram of an amputation used in a scenario of the VR system, according to at least some embodiments disclosed herein.

The simulation engine 124 of the first computing device 118 is configured to control the scenario 148 (of FIG. 14-FIG. 21) for the VR system. It should be appreciated that numerous factors of the scenario 148 may be controlled, such as a time of day, weather events, etc., For example, the option to run the scenario 148 during the nighttime is depicted in FIG. 20. Specifically, the simulation engine 124 may comprise a scenario management component that may be used for generating the scenario 148, executing the scenario 148, and/or playback of previously executed scenarios 148. The simulation engine 124 may also include a data analysis component that may be used for analyzing the scenario 148, which can include performing numerous assessments on the users. The assessments can include reaction time, location analysis, physiological orientation of the user, orientation of the user's head, eye gaze, limb position, and others.

For example, in a given scenario, upon hearing a gunshot, the first user 126 may be trained to drop to a crouched position, turn his head towards the direction of the gunshots, and draw his weapon. To provide a training experience for the first user 126, the scenario 148 is executed by the scenario management component of the simulation engine 124. This scenario management component of the simulation engine 124 may generate the virtual environment, including audio-visual information rendered by the head-mounted display 130.

A gunshot sound is rendered on the headset 170 of the head-mounted display 130 worn by the first user 126, and the scenario management component records this time. The first user 126 starts to move, and the motion tracker determines how long it takes to get into a crouched position, how long it takes for the first user 126 to draw his weapon, and if his head is oriented in the proper position. In embodiments, after a predetermined time (e.g. 2 seconds), the first user 126 orientation and weapon orientation are evaluated. In embodiments, a user score is generated based on the time required for the first user 126 to achieve the proper position. In this way, the first user 126 can continually practice, and review his performance to achieve an optimal reaction time. Other, more complex examples are possible, such as scenarios utilizing multiple friends and foes. In embodiments, one or more of the friends and/or foes may be virtual.

In some examples, the scenario 148 is a 3D scenario. In examples, the scenario 148 is a simulation scenario. In other examples, the simulation scenario may include: a video gaming simulation scenario, a situational awareness training simulation scenario, an entertainment simulation scenario, a traffic stop simulation scenario, a car crash simulation scenario, a lifesaving simulation scenario, a military training simulation scenario, an active shooter simulation scenario, a law enforcement training simulation scenario, a fire fighter training simulation scenario, a flight simulation scenario, a science education simulation scenario, a medical training simulation scenario, a medical response simulation scenario, an emergency response training scenario, an EMS training scenario, a triage training scenario, a paramedic training scenario, a mission rehearsal simulation scenario, or an architectural training simulation scenario, among other examples. A third user 122 (of FIG. 1) may be configured to interact with the first computing device 118 via the GUI 120.

As shown in FIG. 1, the first computing device 118 may also be communicatively coupled to a server 164 and/or communicatively coupled to a second computing device 162. A fourth user 166 may interact with the GUI 120 of the second computing device 162. Additionally, the first computing device 118 may be communicatively coupled to a modular symptoms generator 284, which may also interact with the server 164.

In some examples, the simulation engine 124 of the first computing device 118 may be configured to generate the 3D scenario (e.g., the scenario 148), with images and textures being programmed into graphics engines (not shown) on the first computing device 118. Additionally, the images may be created from digitized photos or video or from scanned images. These virtual images and their 3D characterizations are stored in computer memory on the first computing device 118.

These stored images are manipulated to produce a VR image signal that is presented for displaying to the first user 126 and/or the second user 128. In examples, the simulation engine 124 of the first computing device 118 may transmit the 3D virtual world scenario (e.g., the scenario 148) to the head-mounted display 130 for display to the first user 126 and/or the second user 128. The head-mounted display 130 may project an image or symbology on a user interface/visor or a reticle of the wearer (e.g., the first user 126 or the second user 128).

The head-mounted display 130 may also incorporate a positioning system (not shown) that tracks the head position and angle of the wearer (e.g., the first user 126 or the second user 128), so that the picture or symbology projected by the display is congruent with the outside world using see-through imagery. In even further examples, the head-mounted display 130 may also be used with tracking sensors (such as the position indicator 136 or others) that allow changes of angle and orientation of the wearer/user (e.g., the first user 126 or the second user 128) to be recorded. When such data is available to the system providing the VR environment, it can be used to generate a display that corresponds to the wearer's the angle-of-look at the particular time. This allows the wearer (e.g., the first user 126 or the second user 128) to "look around" a VR environment simply by moving the head without the need for a separate controller to change the angle of the imagery.

In further examples, the head-mounted display 130 may be a VR head-mounted display. In other examples, the head-mounted display 130 may be a visor or a helmet, among other configurations not explicitly listed herein. In additional examples, the head-mounted display 130 may include a user interface 172 (of FIG. 7) that is transparent until a VR image/scenario is displayed and may also include a headset 170 (of FIG. 7) configured to transmit audio to the one or more users (e.g., the first user 126 and/or the second user 128) while the one or more users (e.g., the first user 126 and/or the second user 128) are engaging with the VR system.

Figure 13:
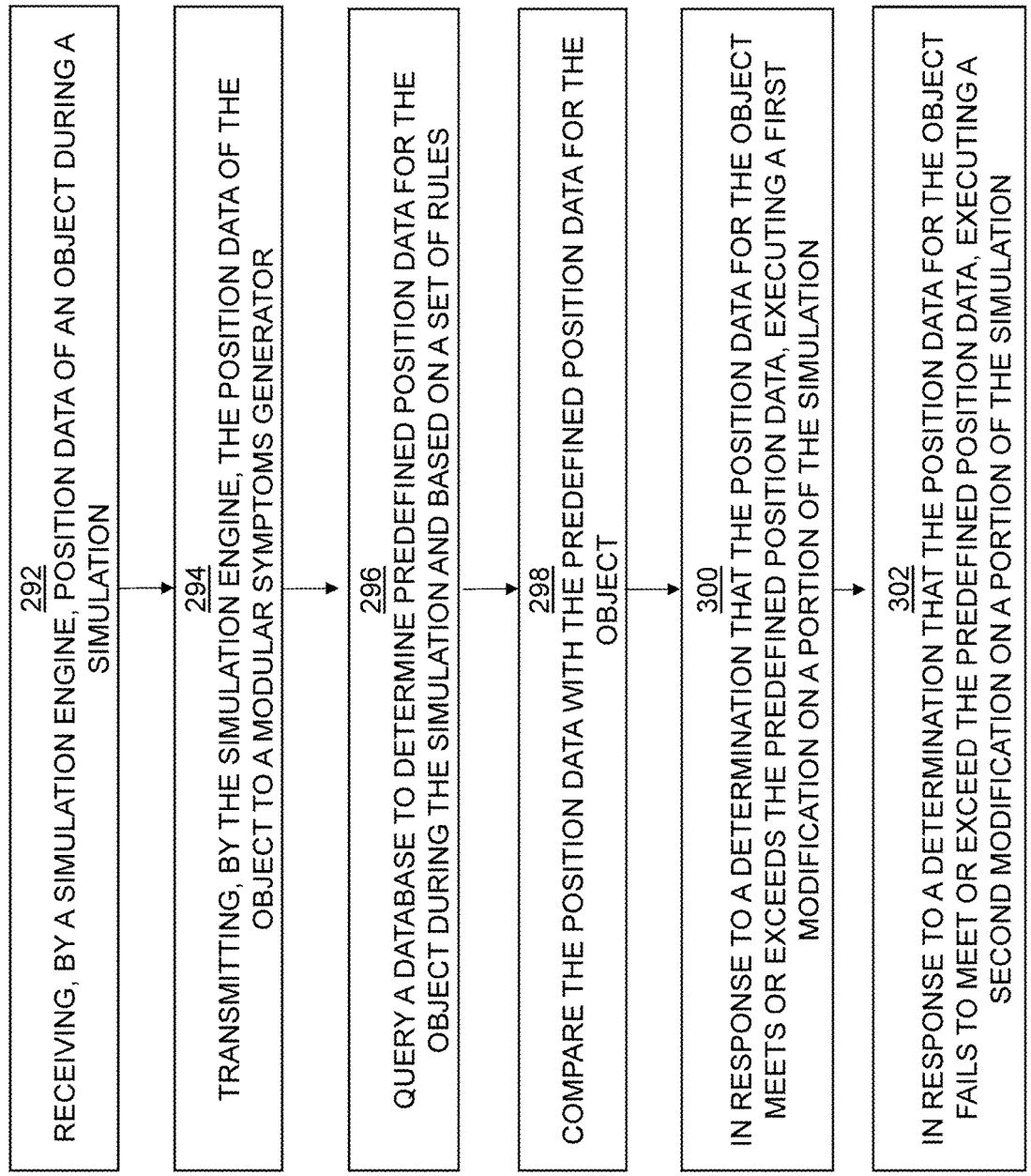
FIG. 13 depicts a block diagram of a method executed by the present invention, according to at least some embodiments disclosed herein.

FIG. 13 depicts a block diagram of a method according to at least some embodiments disclosed herein. A process step 292 begins the method of FIG. 13 and includes the simulation engine 124 receiving position data of an object 150 during the simulation (e.g., the scenario 148). As explained, the object 150 may include: the first user 126, the second user 128, other users, the wearable devices worn by one or more of the users (e.g., the backpack 132, the head-mounted display 130, and one or more ankle/wrist straps 138), the peripheral or weapon 140 used by one or more of the users, and/or the physical object (e.g., the flashlight 286, the doorway, the wall, the ceiling, the floor, the doorknob, the steering wheel, the step, the surface, the freely movable object, the desk, the table, and/or the door), among other examples not explicitly listed herein. The weapon 140 may include the taser 288, the pepper spray 290, the gun, etc.

As explained previously, the scenario 148 is preferably a 3D simulation scenario, such as: a video gaming simulation scenario, a situational awareness training simulation scenario, an entertainment simulation scenario, an active shooter simulation scenario, a military training simulation scenario, a traffic stop simulation scenario, a car crash simulation scenario, a lifesaving simulation scenario, a law enforcement training simulation scenario, a fire fighter training simulation scenario, a flight simulation scenario, a science education simulation scenario, a medical training simulation scenario, a medical response simulation scenario, an emergency response training scenario, an EMS training scenario, a triage training scenario, a paramedic training scenario, a mission rehearsal simulation scenario, or an architectural training simulation scenario, among other examples.

As an illustrative example, the position data may include: position data of the taser 288 held by the first user 126, position data of the first user 126, position data of the doorway, position data of other users (e.g., a gunman and a civilian), position data of the gun held by the gunman, etc. during an active shooter simulation scenario.

A process step 294 follows the process step 292 and includes the simulation engine 124 transmitting the position data of the object 150 to the modular symptoms generator 284.

A process step 296 follows the process step 294 and includes the modular symptoms generator 284 querying a database (not shown) to determine predefined position data for the object 150 during the simulation (e.g., the scenario 148) and based on a set of rules. The predefined position data may be "ideal" position data for each of the objects 150 during a specific simulation or the scenario 148. For example, during the active shooter simulation scenario, the predefined or ideal position data for the first user 126 may include having the taser 288 pointed towards the gunman when the gunman is pointing a weapon at the civilian.

A process step 298 follows the process step 296 and includes the modular symptoms generator 284 comparing the captured position data with the predefined position data for the object 150 during the simulation (e.g., the scenario 148).

A process step 300 follows the process step 298 and includes, in response to a determination that the position data for the object 150 meets or exceeds the predefined position data, the modular symptoms generator 284 executing a first modification on a portion of the simulation (e.g., the scenario 148). As an example and during the active shooter simulation scenario, the first user 126 may be pointing the taser 288 towards the gunman when the gunman is pointing a weapon at the civilian. Since this position data of the first user 126 meets the predefined position data, a portion of the simulation may be modified.

A process step 302 follows the process step 300 and includes, in response to a determination that the position data for the object 150 fails to meet or exceed the predefined position data, the modular symptoms generator 284 executing a second modification on a portion of the simulation (e.g., the scenario 148). As an example and during the active shooter simulation scenario, the first user 126 may have the taser 288 holstered in his belt while the gunman is pointing a weapon at the civilian. Since this position data of the first user 126 fails to meet or exceed predefined position data, a portion of the simulation may be modified.

The first modification differs from the second modification. In the example of the process step 300, the taser 288 may subdue the gunman such that the scenario will be modified from the active shooter simulation to an apprehension simulation whereby the first user 126 apprehends the gunman.

In the example of the process step 302, since the taser 288 was not pointed towards the gunman, the gunman may have fired shots at the civilian and the civilian became injured. Now, the scenario may be modified from the active shooter simulation to a medical response, an emergency response, a triage, or a paramedic training scenario.

It should be appreciated that based on the actions and thus position data of the first user 126, the scenarios may be modified from one to another. If the first user 126 performs the action deemed necessary in that given situation (e.g., it comes close to or exceeds the predefined response), the simulation will move towards a more favorable one. If the first user 126 fails to perform the action necessary in that given situation (e.g., it fails to match or exceed the predefined response), the simulation will move towards a less favorable one (e.g., from a traffic stop simulation scenario to a life-saving simulation scenario, from a car crash simulation scenario to a medical response simulation scenario, etc.).

It should be further appreciated that the method of FIG. 13 may optionally also include a step to deliver electronic impulses to the first user 126 based on the actions performed by the first user 126.

As another example and as depicted in FIG. 22, FIG. 23, FIG. 24, and FIG. 25, a size, shape, and thus severity of a wound 304 (of FIG. 22, FIG. 23, and FIG. 24) and/or an amputation 306 (of FIG. 25) may differ based on the user's reaction while engaging with the scenario 148. Thus, based on the user's actions, the user will be provided with an ability to directly and in real-time respond to any subsequent events that happen after the user acted.

FIG. 14 depicts a block diagram of the scenario 148 displayed on a computing device (e.g., the first computing device 118) and FIG. 15-FIG. 21 depict schematic diagrams of scenarios (e.g., the scenario 148) rendered by the simulation engine 124 of the computing device (e.g., the first computing device 118) and displayed to a user via the GUI 120 of the computing device (e.g., the first computing device 118), according to at least some embodiments disclosed herein.

As depicted in FIG. 14, the simulation engine 124 may comprise custom and client-facing scenario authoring or editing tools. Such client-facing scenario authoring or editing tools allow for an endless amount of options for what unfolds through the scenario 148. In some examples, the simulation engine 124 may comprise custom and client-facing scenario authoring or editing tools geared towards multi-participant and free-roaming VR systems. The authoring or editing tools of the simulation engine 124 may allow one or more users to view 146 (of FIG. 14 and FIG. 15) and/or edit 144 (of FIG. 14 and FIG. 15) a given scenario 148 (of FIG. 14-FIG. 21).

The custom and client-facing scenario authoring or editing tools are non-limiting and may allow the one or more users to first select a base layout 158 (of FIG. 14). The base layout 158 for the scenario may include a school, a warehouse, a park, an office building, etc. Then, the custom and client-facing scenario authoring or editing tools allow the one or more users to drag and drop assets 156, the objects 150, audio stimuli 174, and/or visual stimuli 176 (of FIG. 14) into the base layout 158, allowing this software to be easily used by anyone.

As shown in FIG. 14, the assets 156 may include character assets 168, vehicle assets 170, and/or environmental assets 172. In examples, the character assets 168 may include a civilian, a shooter, a criminal, an adult, or a child, among other examples not explicitly listed herein. The vehicle assets 170 may include numerous types of makes and models of vehicles. In other examples, the environmental assets 172 may include objects, such as a door, a barrier, a weather event, a blood splatter, a bloody footprint, a bullet casing, a bench, a table, a backpack, or a chair, among other examples not explicitly listed herein.

In further examples, the audio stimuli 174 may include a gunshot audio stimuli, a screaming audio stimuli, a door opening audio stimuli, a door closing audio stimuli, or an audio stimuli associated with engaging a gun or a weapon, among other examples not explicitly listed herein. The visual stimuli 176 may include a shooting, a weather event (e.g., lightning or rain), among others. The objects 150 may include blood splatter, bloody footsteps, a deceased civilian, a door triggering, etc. It should be appreciated that examples of the base layout 158, the assets 156, the objects 150, the audio stimuli 174, and the visual stimuli 176 are provided for illustrative purposes only.

A user (e.g., the third user 122 or the fourth user 166) may view the scenario 148 via the GUI 120 of the first computing device 118 and/or the second computing device 162. The third user 122 or the fourth user 166 may search the assets 156 and/or the objects 150. Moreover, the third user 122 or the fourth user 166 may modify any aspects of the assets 156 and/or the objects 150. For example, the third user 122 or the fourth user 166 may modify factors 160 of the assets 156 and/or the objects 150. In an example, the factor 160 may include an appearance of a character (e.g., a shooter) (e.g., height, weight, facial features, skin color, weapon type, and/or initial pose, etc.). In another example, the factor 160 may include a reaction of a civilian, an appearance of a civilian, and/or a movement of a civilian in response to a participant utilizing the system.

Once the scenario is completed, the simulation engine 124 may then revise/update the scenario based on the one or more actions. The updated scenario may be viewed as a "package" (e.g., the packaged project 184) which is the deliverable output of the developers' work. The "package" is a simulation process which contains one or more 3D environments and a bank of entities representing assets.

Each package (e.g., the packaged project 184) may be launched in three distinct modes of operation, including a live simulation mode, an after-action review mode, and a scenario authoring mode.

The scenario authoring mode enables an end-user training authority to create or modify the scenario 148 based on the organization's needs. Such organization may include a law enforcement organization or a military organization, among others. In the scenario authoring mode, the simulation process is run with a dedicated What You See Is What You Get (WYSIWYG) user interface, that allows the user (e.g., the third user 122 or the fourth user 166) to perform numerous actions, such as: view and navigate the included environment(s) in 3D overhead modes, augment the environment layout to create different tactical challenges, control lighting and weather conditions, create a mapping between a physical training space to a specific virtual space in the environment, define teleportation mechanisms between different points in the environment, insert entities from the entity bank into the environment, configure each entity's appearance and behavior, and/or set up logic triggers which affect the scenario based on timers, actions of the trainees, actions of the operator(s) and other scenario related events. The user (e.g., the third user 122 or the fourth user 166) may then save their work.

The data produced in the user interface by the user (e.g., the third user 122 or the fourth user 166) may be serialized to a JSON file and added to the bank of scenario configurations of the package. When the package (e.g., the packaged project 184) is executed in a live simulation session or in after-action review mode, the serialized data is loaded and the entities defined in the data are spawned in the environment.

In examples of the live simulation session, the simulation engine 124 may transmit the 3D virtual world scenario (e.g., the scenario 148) to the user interface 172 of the head-mounted display 130 for display to the first user 126 and/or the second user 128. It should be appreciated that the 3D virtual world scenario unfolds and maneuvers based on the actions of the participants within the system. In some examples, the scenario 148 may utilize teleport triggers to teleport the players/participants (e.g., the first user 126 and/or the second user 128) in order to change the orientation of the scenario 148.

The first camera 104 and/or the second camera 106 may track and identify a position of each position indicator 136 while the first user 126 and/or the second user 128 are freely roaming the physical environment 102. The first camera 104 and/or the second camera 106 may transmit the position data of each position indicator 136 to the first network switch 112. The first network switch 112 may transmit the position data of each position indicator 136 to the third network switch 116. The third network switch 116 may then transmit the position data of each position indicator 136 to the simulation engine 124 of the first computing device 118.

Once the simulation engine 124 of the first computing device 118 receives the position data of each position indicator 136, the simulation engine 124 may then determine a position of the physical object from the position data and may generate a VR image of the physical object. The simulation engine 124 may also apply a predetermined visual texture to the associated object, create an associated texture (e.g., a 2D texture, a 3D texture, or an effect) and then include the associated texture in the VR image.

In some examples, a processing module may include a graphics processing unit (of FIG. 26) for generating the VR image. The identity of an associated object, a predetermined visual texture or 2D or 3D image of the object, and an application of the predetermined visual texture to the associated object may be stored in a memory (of FIG. 26) of the first computing device 118. The memory of FIG. 20 may also be used to store a virtual image of the associated object. The simulation engine 124 may then add the VR image of the object into the VR scenario 148 and may transmit the modified VR scenario to the head-mounted display 130 for display to the first user 126 and/or the second user 128.

Optionally, the simulation engine 124 may then display the VR scenario on the GUI 120 of the first computing device 118 or a second computing device 162 for display to one or more users, such as the third user 122 and/or the fourth user 166. Optionally, the simulation engine 124 may also be configured to generate an audio signal associated with the VR image of the physical object and transmit the audio signal to the headset 170 coupled to the head-mounted display 130 for the first user 126 and/or the second user 128 to hear while engaging in the VR system.

While the first user 126 and/or the second user 128 are engaging in the VR system or after the first user 126 and/or the second user 128 have finished engaging in the VR system, the 3D VR scenario may be rendered by the simulation engine 124 for display via the GUI 120 of the first computing device 118 and/or the second computing device 162. One or more users, such as the third user 122 and/or the fourth user 166 may engage with custom and client-facing scenario authoring or editing tools of the simulation engine 124. In examples, a user (such as the third user 122) may interact with the GUI 120 on the first computing device 118 and may engage in one or more actions to modify the 3D VR scenario. Such actions may include an addition, a deletion, and/or a modification of the assets 156, the objects 150, the audio stimuli 174, and/or the visual stimuli 176. The simulation engine 124 may then revise/update the scenario based on the one or more actions by the third user 122.

In other examples, the simulation engine 124 may receive, from a user (such as the third user 122 or another user), a request to replay the 3D VR scenario in the after-action review mode. Such request for a replay or after-action review may be for training purposes (e.g., to train the first user 126 and/or the second user 128) and provides endless feedback to the first user 126 and/or the second user 128. In response, the simulation engine 124 may replay the scenario on the first computing device 118 or may transmit the scenario to the second computing device 162 to replay to another user (e.g., the fourth user 166).

Systems, Devices, and Operating Systems

Figure 26:
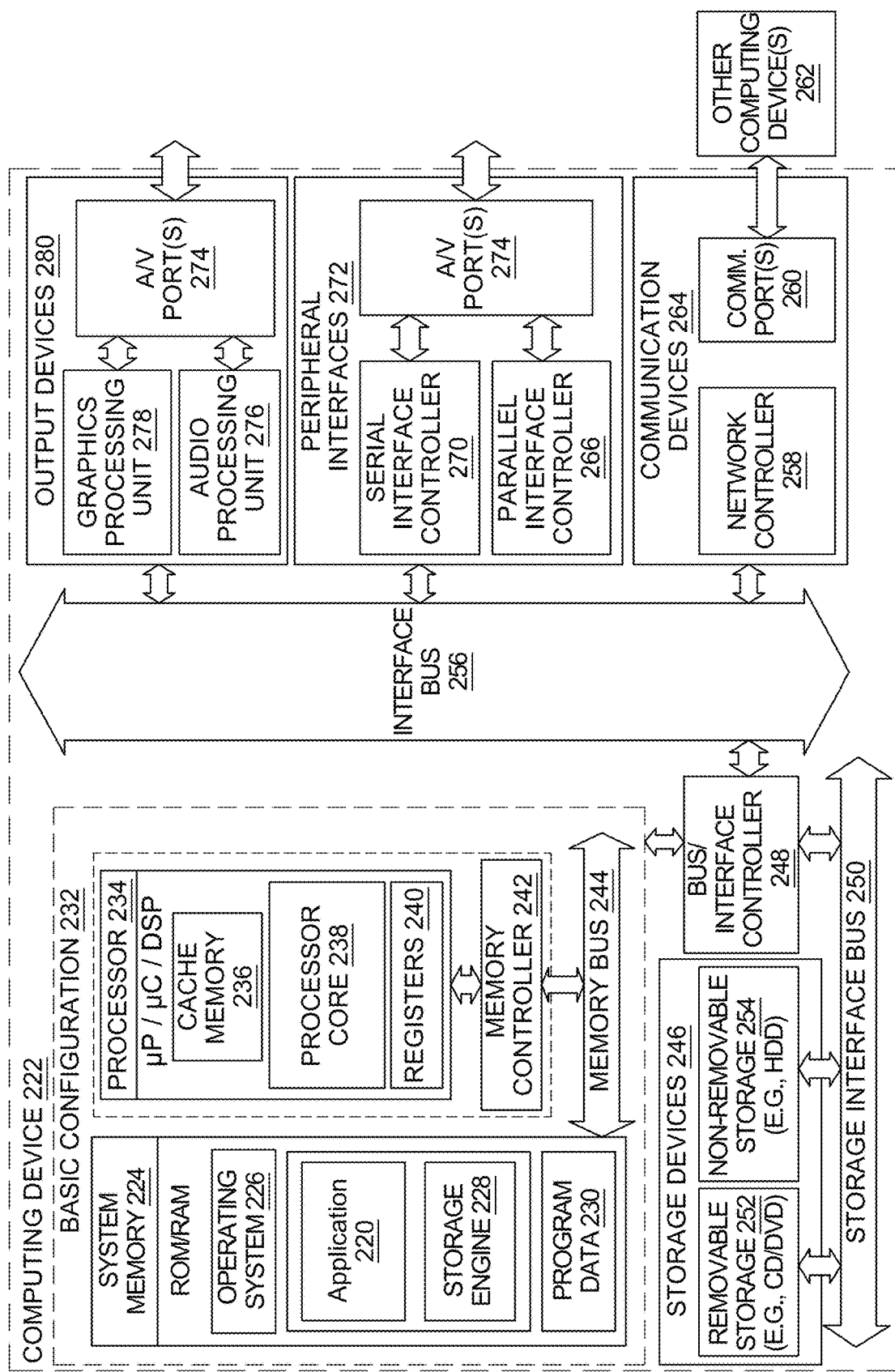
FIG. 26 depicts a block diagram of a computing device for use in a VR system, according to at least some embodiments disclosed herein.

A basic configuration 232 of a computing device 222 (such as the first computing device 118 or the second computing device 162 of FIG. 1) is illustrated in FIG. 26 by those components within the inner dashed line. In the basic configuration 232 of the computing device 222, the computing device 222 includes a processor 234 and a system memory 224. The terms "processor" and "central processing unit" or "CPU" are used interchangeably herein. In some examples, the computing device 222 may include one or more processors and the system memory 224. A memory bus 244 is used for communicating between the one or more processors 234 and the system memory 224.

Depending on the desired configuration, the processor 234 may be of any type, including, but not limited to, a microprocessor (μP), a microcontroller (μC), and a digital signal processor (DSP), or any combination thereof. In examples, the microprocessor may be AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s).

Further, the processor 234 may include one more levels of caching, such as a level cache memory 236, a processor core 238, and registers 240, among other examples. The processor core 238 may include an arithmetic logic unit (ALU), a floating point unit (FPU), and/or a digital signal processing core (DSP Core), or any combination thereof. A memory controller 242 may be used with the processor 234, or, in some implementations, the memory controller 242 may be an internal part of the memory controller 242.

Depending on the desired configuration, the system memory 224 may be of any type, including, but not limited to, volatile memory (such as RAM), and/or non-volatile memory (such as ROM, flash memory, etc.), or any combination thereof. The system memory 224 includes an operating system 226, one or more engines, such as a simulation engine 124, and program data 230. In some embodiments, the simulation engine 124 may be an application, a software program, a service, or a software platform, as described infra. The system memory 224 may also include a storage engine 228 that may store any information of data disclosed herein.

The operating system 226 may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millennium/NT/Vista/XP (Server), Microsoft Windows 8 OS, Microsoft Windows 10 OS, Palm OS, and/or the like. The operating system 226 may be one specifically optimized to be run on a mobile computing device (such as the first computing device 118 or the second computing device 162 of FIG. 1), such as iOS, Android, Windows Phone, Tizen, Symbian, and/or the like.

As explained supra, the GUI 120 may provide a baseline and means of accessing and displaying information graphically to users. The GUI 120 may include Apple Macintosh Operating System's Aqua, IBM's OS/2, Microsoft's Windows 2000/2003/3.1/95/98/CE/Millennium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D) HTML, FLASH, Java, JavaScript, etc. interface libraries such as, but not limited to, Dojo, jQuery (UI), MooTools, Prototype, script.aculo.us, SWFObject, or Yahoo! User Interface, any of which may be used.

Additionally, a web browser component (not shown) is a stored program component that is executed by the CPU. The web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D) HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices.

A web browser may communicate to and/or with other components in a component collection, including itself, and/or facilities of the like. Most frequently, the web browser communicates with information servers, operating systems (such as the operating system 226), integrated program components (e.g., plug-ins), and/or the like; e.g., it may contain, communicate, generate, obtain, and/or provide program component, system, user, and/or data communications, requests, and/or responses. Of course, in place of a web browser and an information server, a combined application may be developed to perform similar functions of both. The combined application would similarly affect the obtaining and the provision of information to users, user agents, and/or the like from the enabled nodes of the present invention.

Moreover, the computing device 222 may have additional features or functionality, and additional interfaces to facilitate communications between the basic configuration 232 and any desired devices and interfaces. For example, a bus/interface controller 248 is used to facilitate communications between the basic configuration 232 and data storage devices 246 via a storage interface bus 250. The data storage devices 246 may be one or more removable storage devices 252, one or more non-removable storage devices 254, or a combination thereof. Examples of the one or more removable storage devices 252 and the one or more non-removable storage devices 254 include magnetic disk devices (such as flexible disk drives and hard-disk drives (HDD)), optical disk drives (such as compact disk (CD) drives or digital versatile disk (DVD) drives), solid state drives (SSD), and tape drives, among others.

In some embodiments, an interface bus 256 facilitates communication from various interface devices (e.g., one or more output devices 280, one or more peripheral interfaces 272, and one or more communication devices 264) to the basic configuration 232 via the bus/interface controller 256. Some of the one or more output devices 280 include a graphics processing unit 278 and an audio processing unit 276, which are configured to communicate to various external devices, such as a display or speakers, via one or more A/V ports 274.

The one or more peripheral interfaces 272 may include a serial interface controller 270 or a parallel interface controller 266, which are configured to communicate with external devices, such as input devices (e.g., a keyboard, a mouse, a pen, a voice input device, or a touch input device, etc.) or other peripheral devices (e.g., a printer or a scanner, etc.) via one or more I/O ports 268.

Further, the one or more communication devices 264 may include a network controller 258, which is arranged to facilitate communication with one or more other computing devices 262 over a network communication link via one or more communication ports 260. The one or more other computing devices 262 include servers (such as the server 164 of FIG. 1), the database, mobile devices, and comparable devices.

The network communication link is an example of a communication media. The communication media are typically embodied by the computer-readable instructions, data structures, program modules, or other data in a modulated data signal, such as a carrier wave or other transport mechanism, and include any information delivery media. A "modulated data signal" is a signal that has one or more of its characteristics set or changed in such a manner as to encode information in the signal. By way of example, and not limitation, the communication media may include wired media (such as a wired network or direct-wired connection) and wireless media (such as acoustic, radio frequency (RF), microwave, infrared (IR), and other wireless media). The term "computer-readable media," as used herein, includes both storage media and communication media.

It should be appreciated that the system memory 224, the one or more removable storage devices 252, and the one or more non-removable storage devices 254 are examples of the computer-readable storage media. The computer-readable storage media is a tangible device that can retain and store instructions (e.g., program code) for use by an instruction execution device (e.g., the computing device 222). Any such, computer storage media is part of the computing device 222.

The computer readable storage media/medium can be a tangible device that can retain and store instructions for use by an instruction execution device. The computer readable storage media/medium may be, for example, but is not limited to, an electronic storage device, a magnetic storage device, an optical storage device, an electromagnetic storage device, and/or a semiconductor storage device, or any suitable combination of the foregoing. A non-exhaustive list of more specific examples of the computer readable storage media/medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and/or a mechanically encoded device (such as punch-cards or raised structures in a groove having instructions recorded thereon), and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The computer-readable instructions are provided to the processor 234 of a general purpose computer, special purpose computer, or other programmable data processing apparatus (e.g., the computing device 222) to produce a machine, such that the instructions, which execute via the processor 234 of the computer or other programmable data processing apparatus, create means for implementing the functions/acts specified in the block diagram blocks. These computer-readable instructions are also stored in a computer-readable storage medium that can direct a computer, a programmable data processing apparatus, and/or other devices to function in a particular manner, such that the computer-readable storage medium having instructions stored therein comprises an article of manufacture including instructions, which implement aspects of the functions/acts specified in the block diagram blocks.

The computer-readable instructions (e.g., the program code) are also loaded onto a computer (e.g. the computing device 222), another programmable data processing apparatus, or another device to cause a series of operational steps to be performed on the computer, the other programmable apparatus, or the other device to produce a computer implemented process, such that the instructions, which execute on the computer, the other programmable apparatus, or the other device, implement the functions/acts specified in the block diagram blocks.

Computer readable program instructions described herein can also be downloaded to respective computing/processing devices from a computer readable storage medium or to an external computer or external storage device via a network (e.g., the Internet, a local area network, a wide area network, and/or a wireless network). The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer/computing device, partly on the user's computer/computing device, as a stand-alone software package, partly on the user's computer/computing device and partly on a remote computer/computing device or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Another embodiment of the invention provides a method that performs the process steps on a subscription, advertising, and/or fee basis. That is, a service provider can offer to assist in the method steps of providing the VR system. In this case, the service provider can create, maintain, and/or support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

Aspects of the present invention are described herein with reference to block diagrams of methods, computer systems, and computing devices according to embodiments of the invention. It will be understood that each block and combinations of blocks in the diagrams, can be implemented by the computer readable program instructions.

The block diagrams in the Figures illustrate the architecture, functionality, and operation of possible implementations of computer systems, methods, and computing devices according to various embodiments of the present invention. In this regard, each block in the block diagrams may represent a module, a segment, or a portion of executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block and combinations of blocks can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A virtual reality system comprising:
   a physical environment defined at least partially by a physical coordinate system and comprising one or more physical objects;
   one or more users located in the physical environment, wherein each of the one or more users is configured with wearable devices and a weapon, and wherein each of the wearable devices and the weapon comprises a position indicator configured to detect position data in the physical environment;
   a computing device communicatively coupled to a server, the computing device comprising a simulation engine;
   a modular symptoms generator configured to interact with the simulation engine and the server, wherein the modular symptoms generator is configured to establish a set of rules based on relative object position interrelationship, predetermined position data for each of the rules, and a set of at least two simulation modifications triggered by results from matching the predetermined position data to corresponding ones of the rules, wherein each of the rules includes a rule dependent upon positional information of the weapon, which one of the users is wielding the weapon, and dependent upon a facing direction of the weapon to a position of a target one of the users, the target user being affected by the facing direction per a simulation scenario for which the at least two simulation modifications apply; and
   the physical environment comprising:
   one or more cameras configured to:
     monitor a portion of the physical environment;
     capture the position data of each position indicator within the portion of the physical environment; and
     transmit the position data of each position indicator within the portion of the physical environment to a network switch, wherein the position indictors are utilized to derive the predefined position data defined by the rules;

the network switch configured to transmit the position data of each position indicator within the portion of the physical environment to the computing device.

2. The virtual reality system of claim 1, wherein the wearable devices are selected from the group consisting of: a virtual reality head-mounted display, a backpack, at least one ankle strap, and at least one wrist strap.

3. The virtual reality system of claim 1, wherein the simulation engine is configured to control a scenario for the virtual reality system.

4. The virtual reality system of claim 1, wherein the weapon is selected from the group consisting of: a taser, a pepper spray canister, a gun, and a flashlight.

5. A method executed by a virtual reality system for providing a simulation scenario, the method comprising:

receiving, by a simulation engine of the virtual reality system, position data of a set of objects during the simulation scenario, wherein each of the objects is dynamically movable during the simulation scenario, and wherein dynamic movements of the objects cause the related position data to correspondingly change;

transmitting, by the simulation engine, the position data of the objects to a modular symptoms generator of the virtual reality system;

receiving, by the modular symptoms generator, the position data of the objects;

querying, by the modular symptoms generator, a database to determine predefined position data for the objects during the simulation scenario and based on a set of rules, wherein the predefined position data and the set of rules are based on relative position data of a plurality of the objects to each other, wherein each of the rules includes one dependent upon a hand-held one of the objects carried by a wielding human represented by another of the objects and dependent upon a facing direction of the hand-held one of the objects relative to a position of a target one of the objects, the target object being affected by the facing direction per the simulation scenario and the related one of the rules, and wherein each of the rules comprises at least one simulation modification triggered responsive to a degree to which the rule is satisfied per the relative position data;

comparing, by the modular symptoms generator, the position data with the predefined position data for the objects during the simulation scenario;

in response to a determination that the position data for the object meets or exceeds the predefined position data indicating satisfaction of a predefined scenario condition dependent upon relative positions of the objects including the facing direction of the hand-held one relative to the target one of the objects per a related one of the rules, executing, by the modular symptoms generator, a first modification on a portion of the simulation scenario consistent with the predefined scenario condition; and in response to a determination that the position data for the object fails to meet or exceed the predefined position data indicating non-satisfaction of the predefined scenario condition, executing, by the modular symptoms generator, a second modification on a portion of the simulation scenario.

6. The method of claim 5, wherein each of the objects is selected from the group consisting of: a user, a wearable device, a weapon, and a physical object.

7. The method of claim 5, wherein at least one of the objects is a wearable device, and wherein the wearable device is selected from the group consisting of: a backpack, a head-mounted display, an ankle strap, and a wrist strap.

8. The method of claim 5, wherein at least one of the objects is a physical object, and wherein the physical object is selected from the group consisting of: a flashlight, a doorway, a wall, a ceiling, a floor, a doorknob, a steering wheel, a step, a surface, a freely movable object, a desk, a table, and a door.

9. The method of claim 5, wherein at least one of the objects is a weapon, and wherein the weapon is selected from the group consisting of: a taser, a pepper spray canister, and a gun.

10. The method of claim 5, wherein the simulation scenario is selected from the group consisting of: a video gaming simulation scenario, a situational awareness training simulation scenario, an entertainment simulation scenario, an active shooter simulation scenario, a military training simulation scenario, a traffic stop simulation scenario, a car crash simulation scenario, a lifesaving simulation scenario, a law enforcement training simulation scenario, a fire fighter training simulation scenario, a flight simulation scenario, a science education simulation scenario, a medical training simulation scenario, a medical response simulation scenario, an emergency response training scenario, an electrical muscle simulation (EMS) training scenario, a triage training scenario, a paramedic training scenario, a mission rehearsal simulation scenario, and an architectural training simulation scenario.

11. The method of claim 5, wherein the predefined position data comprises ideal position data for the set of objects during the simulation scenario.

12. The method of claim 5, wherein the first modification differs from the second modification.

13. The method of claim 5, wherein the first modification results in a first new simulation scenario, and wherein the second modification results in a second new simulation scenario.

14. The method of claim 13, wherein the first new simulation scenario is more favorable as compared to the second new simulation scenario.

15. The method of claim 5, wherein the hand-held object is a gun.

16. The method of claim 5, wherein the wielding human is a law enforcement professional engaging in the simulation scenario as part of training for a job.

17. The method of claim 5, wherein the hand-held object is a gun, and wherein the wielding human is a law enforcement professional, wherein the first modification is one reactive to following proper firearm discipline for the simulation scenario, wherein the second modification is one reactive to not following proper firearm discipline for the simulation scenario.

18. The method of claim 5, wherein the target object is carrying a hand-held weapon, which is another of the objects, and wherein a bystander potentially threaded by the target is a another of the objects, wherein the rule and the predefined position data are dependent upon whether the hand-held weapon is positioning facing the bystander at a distant representing relative immediate danger or not, which affects an optimal position of wielding human and a hand-held object relative to the simulation scenario.

19. The method of claim 5, wherein processing latencies are reduced through the predefined position data and the rules, relative to relying upon reactive programming based upon movement of the objects alone.

* * * * *